(12) United States Patent
Kim et al.

(10) Patent No.: US 11,738,515 B2
(45) Date of Patent: Aug. 29, 2023

(54) SYSTEMS AND METHODS FOR GENERATING A MOLECULAR DYNAMIC GRADED LATTICE STRUCTURE AND THEIR APPLICATION TO ADDITIVE MANUFACTURING

(71) Applicant: UT Battelle, LLC, Oak Ridge, TN (US)

(72) Inventors: Seokpum Kim, Oak Ridge, TN (US); Ahmed Arabi Hassen, Oak Ridge, TN (US); Lonnie J. Love, Oak Ridge, TN (US); Vlastimil Kunc, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 17/545,159

(22) Filed: Dec. 8, 2021

(65) Prior Publication Data
US 2022/0143918 A1 May 12, 2022

Related U.S. Application Data

(63) Continuation of application No. 17/333,619, filed on May 28, 2021, now Pat. No. 11,602,898.
(Continued)

(51) Int. Cl.
*B29C 64/386* (2017.01)
*B29C 64/118* (2017.01)
(Continued)

(52) U.S. Cl.
CPC .......... *B29C 64/386* (2017.08); *B29C 64/118* (2017.08); *B33Y 10/00* (2014.12); *B33Y 30/00* (2014.12); *B33Y 50/00* (2014.12)

(58) Field of Classification Search
None
See application file for complete search history.

(56) References Cited

U.S. PATENT DOCUMENTS

| | | | |
|---|---|---|---|
| 9,586,364 B2 * | 3/2017 | El-Siblani | B29C 64/393 |
| 2003/0067461 A1 * | 4/2003 | Fletcher | G06T 17/20 |
| | | | 345/420 |

(Continued)

OTHER PUBLICATIONS

Wang, Y. et al., "Design of graded lattice structure with optimized mesostructures for additive manufacturing", Materials & Design, vol. 142, Jan. 2018, pp. 114-123.
(Continued)

*Primary Examiner* — Yung-Sheng M Tsui
(74) *Attorney, Agent, or Firm* — Warner Norcross + Judd LLP

(57) ABSTRACT

Systems and methods for generating molecular dynamic graded lattice structures that can be used as infill for additively manufactured articles. Molecular dynamically generated lattice infill is based on force balancing a node distribution instead of a circle packing. Field data can be utilized to adjust the spacing of the node distribution according to a force balance equilibrium model that accounts for the field expected to be experienced by the article being additively manufactured. The resultant non-uniform honeycomb structures from force-balancing robustly and efficiently address the connection issues with traditional non-uniform lattice structures.

13 Claims, 19 Drawing Sheets

Related U.S. Application Data

(60) Provisional application No. 63/032,038, filed on May 29, 2020.

(51) Int. Cl.
B33Y 50/00 (2015.01)
B33Y 30/00 (2015.01)
B33Y 10/00 (2015.01)

(56) References Cited

U.S. PATENT DOCUMENTS

| | | | |
|---|---|---|---|
| 2016/0209820 | A1 | 7/2016 | Banadyga et al. |
| 2016/0318259 | A1* | 11/2016 | Seto ..................... H04N 1/6094 |
| 2016/0321384 | A1* | 11/2016 | Pal .......................... B33Y 50/02 |
| 2017/0097630 | A1* | 4/2017 | Nemiroski ............ G03F 7/0002 |
| 2017/0148182 | A1* | 5/2017 | Yoshida ..................... G06T 7/13 |
| 2017/0339318 | A1* | 11/2017 | Nishikawa ........... H04N 1/6086 |
| 2019/0032491 | A1* | 1/2019 | Nissen ................. B23K 26/342 |
| 2021/0177093 | A1* | 6/2021 | Perrault ................. B33Y 80/00 |

OTHER PUBLICATIONS

Nguyen, D.S. et al., "A Method to Generate Lattice Structure for Additive Manufacturing", 2016 IEEE International Conference on Industrial Engineering and Engineering Management, pp. 966-970.

Helou, M. et al., "Design, analysis and manufacturing of lattice structures: an overview", International Journal of Computer Integrated Manufacturing, vol. 31, No. 3, 2018, pp. 243-261.

Schoen, A.H., "Infinite periodic minimal surfaces without self-intersections", NASA Technical Note D-5541, May 1970, pp. 1-100.

Hao, L. et al., "Design and Additive Manufacturing of Cellular Lattice Structures", Innovative Developments in Virtual and Physical Protyping, 2012, pp. 1-7.

Deshpande, V.S. et al., "Effective properties of the octet-truss lattice material", Journal of the Mechanics and Physics of Solids, vol. 49, 2001, pp. 1747-1769.

Hyun, S. et al., "Simulated Properties of Kagome and Tetragonal Truss Core Panels", International Journal of Solids and Structures, vol. 40, No. 25, 2003, pp. 6989-6998.

Slic3r Infill Patterns, downloaded at http://manual.slic3r.org/expert-mode/infill, available at least as of May 28, 2020, pp. 1-9.

Ultimaker, Ultimaker Cura, downloaded at https://ultimaker.com/software/ultimaker-cura, available at least as of Oct. 9, 2019, pp. 1-2.

Simplify3D, 2021, downloaded at https://www.simplify3d.com/support/videos/infill-pattern-basics/, available at least as of May 28, 2020, pp. 1-3.

Oxman, N., "Variable property rapid prototyping" Virtual and Physical Prototyping, vol. 6, No. 1, Mar. 2011, pp. 3-31.

Sudbury, Z. et al., "Characterizing Material Transition for Functionally Graded Material Using Big Area Additive Manufacturing", Solid Freeform Fabrication 2016: Proceedings of the 27th Annual International Solid Freeform Fabrication Symposium, pp. 738-747.

Vaezi, M. et al., "Multiple material additive manufacturing—Part 1: a review" Virtual and Physical Prototyping, vol. 8, No. 1, 2013, pp. 19-50.

Cheng, L. et al., "Functionally Graded Lattice Structure Topology Optimization for the Design of Additive Manufactured Components with Stress Constraints", Computer Methods in Applied Mechanics and Engineering, vol. 344, 2019, pp. 1-51.

Li, D. et al., "Optimal design and modeling of gyroid-based functionally graded cellular structures for additive manufacturing", Computer-Aided Design, vol. 104, 2018, pp. 87-99.

Zegard, T. et al., "Bridging topology optimization and additive manufacturing", Structural Multidisciplinary Optimization, vol. 53, 2016, pp. 175-192.

Mitropoulou, C.C. et al., "Evolution Strategies-Based Metaheuristics in Structural Design Optimization", Chapter 4, Dec. 2013, pp. 79-102.

Eschenauer, H.A. et al. "Bubble method for topology and shape optimization of structures", Structural Optimizations, vol. 8, 1994, pp. 42-51.

Sid, B. et al., "Topology optimization using an adaptive genetic algorithm and a new geometric representation", Computer Aided Optimum Design in Engineering IX, 2005, pp. 127-135.

Bendsøe, M.P., "Generating optimal topologies in structural design using a homogenization method", Computer Methods in Applied Mechanics and Engineering, vol. 71, 1988, pp. 197-224.

Suzuki, K. et al., "A homogenization method for shape and topology optimization", Computer Methods in Applied Mechanics and Engineering, vol. 93, 1991, pp. 291-318.

Bureerat, S., et al., "Structural topology optimisation using simulated annealing with multi resolution design variables", Finite Elements in Analysis and Design, Vo. 44, No. 12, 2008, pp. 738-747.

Kim, S. et al., "An integrated design approach for infill patterning of fused deposition modeling and its application to an airfoil", Society of the Advancement of Material and Process Engineering (SAMPE) Conference Proceedings, May 2017, pp. 2136-2148.

Stephenson, K., "A Probabilistic Proof of Thurston's Conjecture on Circle Packings", Rendiconti del Seminario Matematico e Fisico di Milano, vol. 66, No. 1, 1996, pp. 1-66.

Ivrii, O. et al., "Homogenization of random quasiconformal mappings and random Delauney triangulations", May 20, 2019, available at arXiv:1905.07932, pp. 1-30.

He, Z-X, et al., "On the convergence of circle packings to the Riemann map", Inventiones mathematica, vol. 125, 1996, pp. 285-305.

Beardon, A.F. et al., "The Uniformization Theorem for Circle Packings", Indiana University Mathematics Journal, vol. 39, No. 4, 1990, pp. 1383-1425.

Stephenson, K., "The Approximation of Conformal Structures via Circle Packing", Computational Methods and Function Theory, Proceedings of the Third CMFT Conference, 1997, pp. 1-31.

Rodin, B. et al., "The Convergence of Circle Packings to the Riemann Mapping", Journal of Differential Geometry, vol. 26, No. 2, 1987, pp. 349-360.

Collins, C.R. et al., "A circle packing algorithm", Computational Geometry, vol. 25, No. 3, 2003, pp. 233-256.

Orick, G.L., "A linearized circle packing algorithm", Computational Geometry, vol. 64, 2017, pp. 13-29.

Stephenson, K., "Introduction to circle packing: The theory of discrete analytic functions", The American Mathematical Society, vol. 46, No. 3, Jul. 2009, pp. 511-525.

Hurdal, M.K. et al., "Discrete conformal methods for cortical brain flattening", NeuroImage, vol. 45, 2009, pp. S86-S98.

Hagh, V.F. et al., "A broader view on jamming: from spring networks to circle packings", Soft Matter, vol. 15, No. 15, 2019, pp. 3076-3084.

Canright, G. et al., "Disordered Ground States for Classical Discrete-State Problems in One Dimension", Journal of Statistical Physics, vol. 84, Nos. 5/6, 1996, pp. 1095-1131.

Stephenson, K., "Circle Packing Images", downloaded at http://circlepack.com, available as of May 28, 2020, p. 1.

Jacobs, E.N., "The Characteristics of 78 Related Airfoil Sections from Tests in the Variable-Density Wind Tunnel", National Advisory Committee for Aeronautics, Report No. 460, Nov. 1933, pp. 1-61.

Horizon Hobby, LLC, "RC Planes", downloaded at http://horizonhobbyllc.com, available as of May 28, 2020, pp. 1-4.

Kim, S. et al., "Analysis on part distortion and residual stress in big area additive manufacturing with carbon fiber-reinforced thermoplastic using dehomogenization technique", The Composites and Advanced Materials Expo (CAMX), 2019, pp. 1-14.

Kim, S. et al., "Graded infill structure of wind turbine blade accounting for internal stress in big area additive manufacturing", CAMX Conference Proceedings, Dallas, Texas, 2018, pp. 1-10.

Roschli, A. et al., "Creating toolpaths without starts and stops for extrusion-based systems", Solid Freeform Fabrication 2019: Proceedings of the 30th Annual International Solid Freeform Fabrication Symposium, pp. 1-13.

(56) References Cited

OTHER PUBLICATIONS

Wang, Y. et al., "Design of graded lattice structure with optimized mesostructures for additive manufacturing", Journal of Materials & Design, accepted Jan. 7, 2018, pp. 1-27.

* cited by examiner

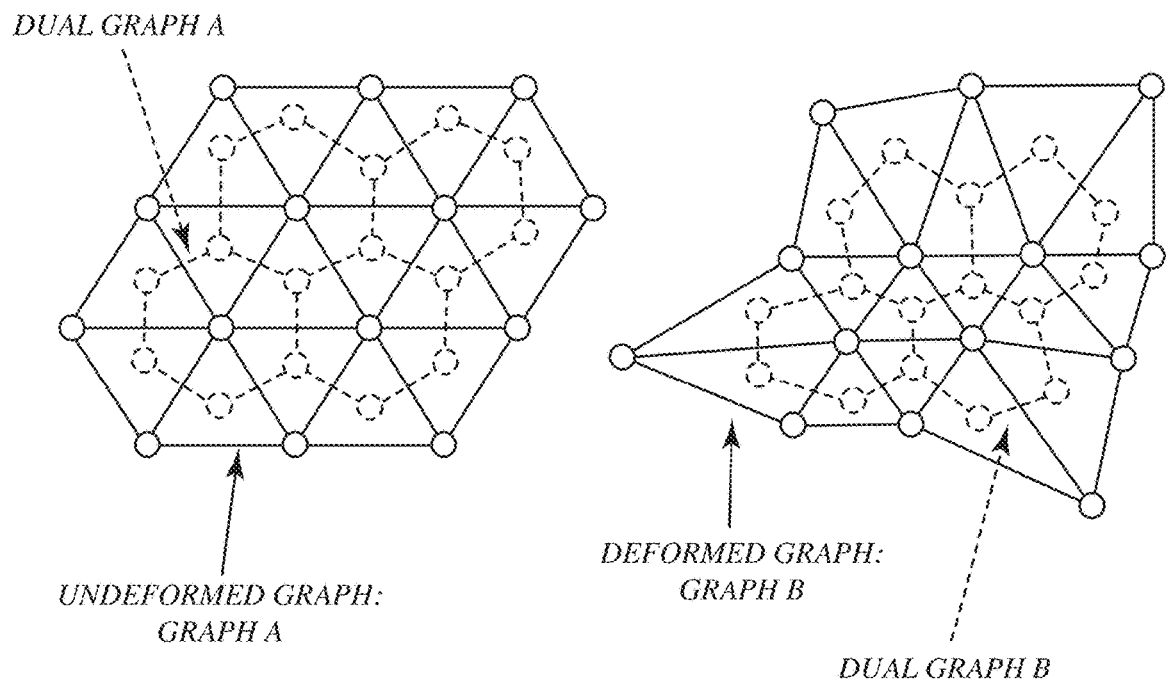
*Fig. 11*  *Fig. 12*
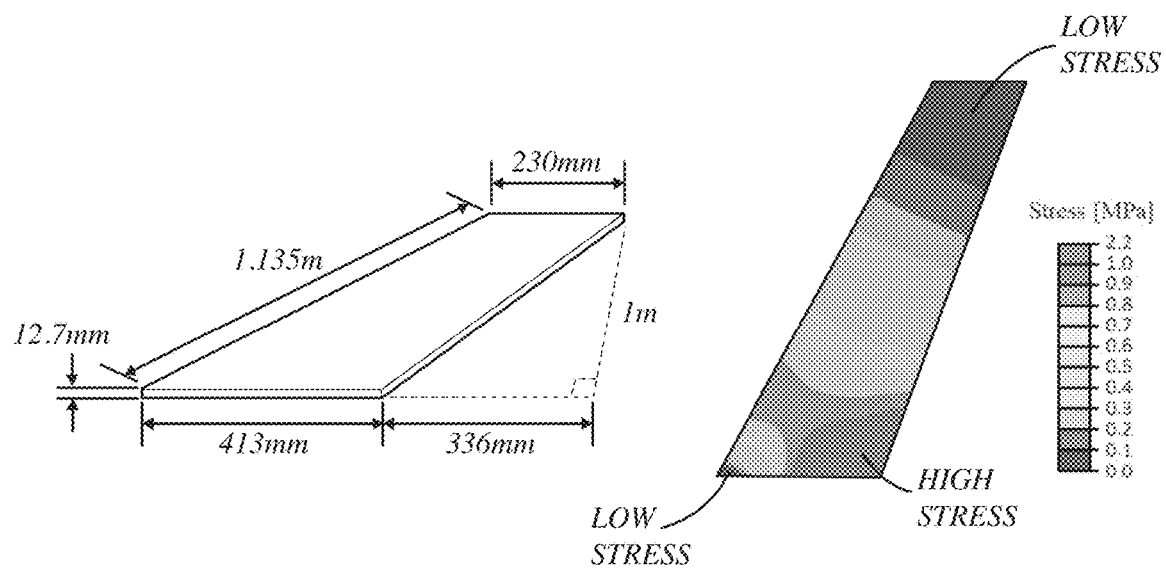
*Fig. 13A*  *Fig. 13B*

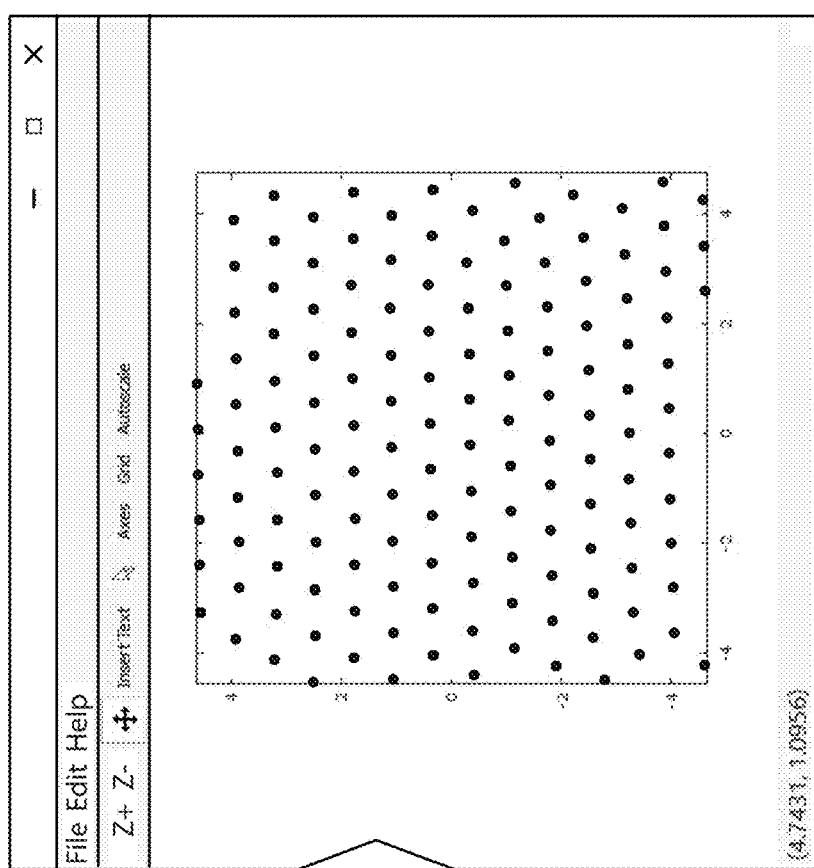
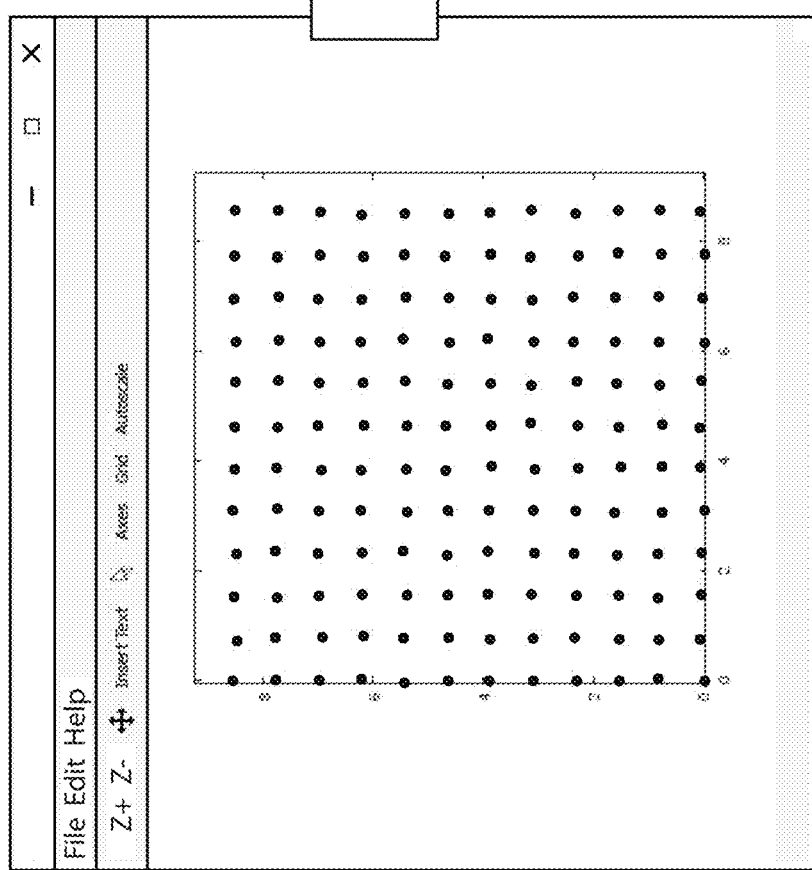
Fig. 19

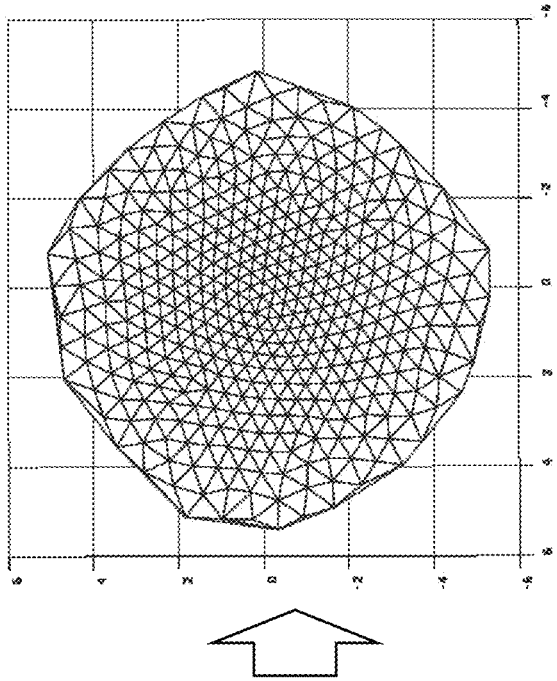
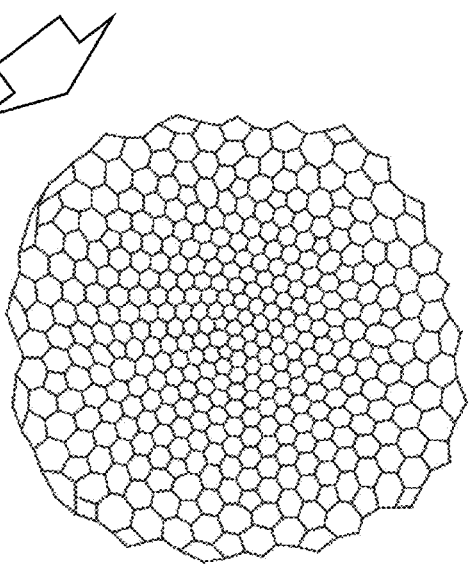
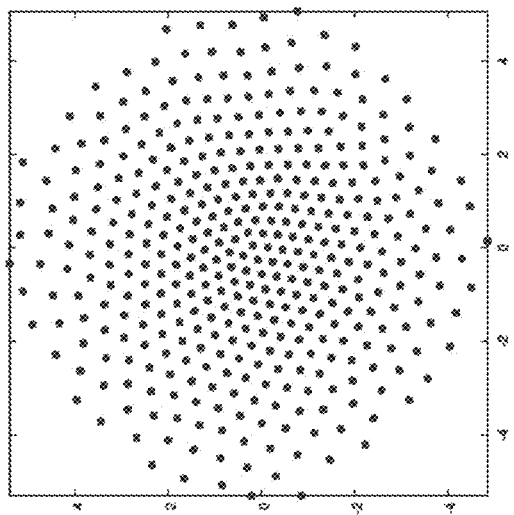
Fig. 21A
Fig. 21B
Fig. 21C

SYSTEMS AND METHODS FOR GENERATING A MOLECULAR DYNAMIC GRADED LATTICE STRUCTURE AND THEIR APPLICATION TO ADDITIVE MANUFACTURING

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

Additive manufacturing (also known as 3D printing) allows complex geometry to be manufactured, which has been a challenging task with conventional manufacturing technologies such as machining, compression molding, or casting. In additive manufacturing, the complexity of a geometry does not require additional processes, unlike other manufacturing technologies. For example, compression molding or injection molding requires a mold or a die which has been conventionally manufactured by machining, and a geometric complexity causes high cost in machining a mold. In additive manufacturing, such complexity may not involve additional cost, and moreover, may be able to reduce article weight. Specifically, a complex geometry of an internal lattice structure can provide a solution to lightweight applications with a good weight-to-volume ratio while satisfying desirable performance metrics. Various types of lattice structures exist in additive manufacturing. Lattice structures can be periodic or stochastic in nature. Some lattice designs include the Schoen gyroid, a Schwarz diamond, an octet lattice, or the Kagome lattice, to name a few. A lattice can be formed by creating a unit cell and replicating it periodically over a region of interest. Lattices can be fully three dimensional or arise in a "2+1" regime, in which a two-dimensional lattice is repeated periodically layer upon layer.

In additive manufacturing, 3D printed structures can be converted from Computer Aided Design ("CAD") to layers of a print. In general, a CAD file or other representation of the part can be obtained and exported to a stereolithographic ("STL") file, which triangulates the article surface into a tessellated approximation. Slicer software can then slice the representation of the article in the STL file into consecutive layers, defining the print boundary for each layer. The slicer software can output G-Code or other additive manufacturing instructions that dictate the tool path or scan pattern for a 3D printer to execute and generate a physical manifestation of the target article. Various known CAD packages have lattice generation methods. For example, Within Medical (Autodesk, Inc., USA), Materialise Magics (Materialise NV), nTopology Element (nTopology, Inc., USA) and Simpleware CAD (Simpleware, Exeter, UK), as well as software plugins such as IntraLattice include the ability to generate a lattice structure.

Honeycomb and other uniform lattice structures are widely used in additive manufacturing. Infill generation algorithms for uniform lattice structures are provided in many different commercially available slicer software programs. Lattice generation is often three-dimensional but known lattice generation methodologies in slicer software programs do not properly account for the layered nature of additive manufacturing. For example, there are several slicer software programs available on the market for desktop 3D printers (e.g., Slic3r, Cura, and Simplify3D, to name a few) that offer two-dimensional lattice structure generation. However, they generally produce lattice structures with uniform unit size and do not account for a graded stress field that a printed part might incur under use. In contrast, some CAD packages include lattice generation features that purport to account for a stress field. However, these packages generally just utilize a simple functionally graded structure ("FGS") approach in which the lattice generation algorithm changes a local wall thickness (or a bead thickness) based on a graded field.

Functionally graded material ("FGM") or FGSs can be found in natural materials including wood, sponges, and coral. The application of FGMs or FGSs in additive manufacturing has generally focused on changing the material itself gradually from material A to material B or changing the local wall thickness as the deposition proceeds. For example, one lattice generation method utilizes a material transition from glass fiber-filled ABS to carbon fiber-filled ABS in big area additive manufacturing (BAAM). On the FGS front, a truss structure having an isogrid internal pattern with local thickness varying based on the loading and the boundary conditions has been provided. In another instance, a square grid structure was created with varying local thickness in a beam in order to increase performance. In yet another case, an algorithm varies the local thickness of cellular structures to increase stiffness. Sometimes these FGS approaches are referred to as density-based topology optimization.

Topology optimization is a method to minimize or reduce the volume in a part design under physical constraints, typically imposed stress and boundary conditions. Various approaches for topology optimization have been created, including: the hard-kill and soft-kill approaches, the bubble method, genetic algorithm methods, homogenization theory methods, and simulated annealing methods. These approaches can be useful in designing minimal weight, manufacturable lattices, that often have unexpected geometric and topological properties in their designs. However, they have limited applicability in additive manufacturing.

Put another way, current topology optimization in the additive manufacturing context is basically limited to thickening local edges (or lines) with a uniform base structure. This approach is not efficient in extrusion-based additive manufacturing where infill edges are extrusion lines, and thick edges are printed by extruding multiple times at the same location. This causes at least two significant issues: (1) the local thickness cannot be gradually changed (e.g., from 1, 1.2, 1.5, to 2), because a given edge is printed by an integer number of extrusions (e.g., printed once or twice, but not one and a half times); and (2) non-uniform thickness of edges require jump movements of a nozzle that cause stop and start of the extrusion process. The present disclosure addresses these and other issues.

SUMMARY OF THE INVENTION

The present disclosure provides systems and methods for generating non-un-uniform graded lattice infill for additive manufacturing articles. The non-uniform lattice cells can be scaled based on a physical field having a non-uniform intensity distribution, such as a temperature or stress field. Additive manufacturing instructions can be generated that, when executed on an additive manufacturing machine, generate a non-uniform, graded infill structure based on a selected field.

In general, one innovative aspect of the subject matter described in this specification can be embodied in a method for fabricating an article, the article configured to experience, during operation of the article, a physical field having a non-uniform intensity over the extent of the article. The method can include generating, by a computer system, representations of layers of the article. Each layer can include an infill portion corresponding to a field-tailored lattice having cells with sides of the same thickness. Generating the field-tailored lattice for a layer can include: (i) circle-packing the infill portion of the layer, such that adjacent circles are tangentially in contact, and sizes of the circles correlate to values of the intensity of the physical field at the circles' locations, (ii) computing an intermediate lattice having triangular cells, such that vertices of a triangular cell correspond to centers of three adjacent circles of the circle-packed infill portion, and (iii) computing the field-tailored lattice having polygonal cells with 4 to 8 walls, such that sides of a polygonal cell correspond to segments between centers of adjacent triangles of the intermediate lattice. Each layer of the article can be printed by an additive manufacturing printer in communication with the computer system to fabricate a respective structure embodying the corresponding field-tailored lattice in that layer's infill portion.

In general, another innovative aspect of the subject matter described in this specification can be embodied in a slicer computer system for additive manufacture of an article. The slicer computer system includes memory configured to store (i) surface data representative of a surface of the article, (ii) field data representative of intensity values of a non-uniform physical field corresponding to the article; (iii) a slicer software program; and (iv) additive manufacturing instructions for the article. The system also includes a processor in communication with the memory. The processor is configured to execute the slicer software program stored in memory to convert surface data and field data of the article into additive manufacturing instructions for fabricating a non-uniform infill lattice structure for the article. Execution of the slicer software program to generate the additive manufacturing instructions includes (i) simulation of packing a planar region representative of an infill layer portion of the article with packing shapes (e.g., packing circles), wherein sizes of the packing shapes across the planar region are selected based on intensity values of the non-uniform physical field at corresponding locations of the packing shapes in the planar region representative of the infill layer portion of the article, (ii) simulation of generation of an intermediate lattice structure having a first set of polygonal cells, wherein vertices of the first set of polygonal cells correspond to centers of adjacent packing shapes and wherein sides of the first set of the polygonal cells correspond to segments between the vertices of the first set of polygonal cells, (iii) simulation of generation of the infill lattice structure having a second set of polygonal cells, wherein vertices of the second set of polygonal cells correspond to centers of adjacent polygonal cells of the first set of polygonal cells of the intermediate lattice and wherein sides of the second set of the polygonal cells correspond to segments between the vertices of the second set of polygonal cells, and (iv) conversion of the second set of polygonal cells of the simulated infill lattice structure to additive manufacturing instructions for printing, by an additive manufacturing printer, a respective physical infill lattice structure embodying the corresponding simulated infill lattice structure as the infill layer portion of the article, and (v) storing the additive manufacturing instructions in memory.

The foregoing aspects and other embodiments can each optionally include one or more of the following features, alone or in combination. In particular, one embodiment includes all the following features in combination.

In some embodiments, the method can include the field-tailored lattice being a graded honeycomb lattice with hexagonal cells of different side lengths. Smaller side lengths can correspond to high values of the physical field and larger side lengths can correspond to low values of the physical field.

In some embodiments, the field-tailored lattice includes two or more patches, each patch having hexagonal cells with different side lengths among different patches, such that smaller side lengths correspond to high values of the physical field and larger side lengths correspond to low values of the physical field, and one or more transition zones disposed between the patches, each transition zone having polygonal cells with 4, 5, 7, or 8 sides. Each patch can have hexagonal cells of the same side length within the same patch.

The first set of polygon cells of the infill portion of the layer can also be constructed to placing polygon vertices on the perimeter of the infill portion and further by pinning some or all of those polygon vertices at designated points on the perimeter. The effect on the second set of polygonal cells is to have edges roughly perpendicular to the infill layer perimeter. In essence, pinning at a perimeter involves placing a first set of polygons at the perimeter, and placing a second, inner, set of polygons, relative to the first set. Shape-packing (e.g., circle-packing) of the infill portion of the layer can also include placing boundary shapes (e.g., boundary circles) on a perimeter of the infill portion. The perimeter can have corners, and the shape-packing (e.g., circle-packing) can include pinning particular boundary shapes (e.g., circles) to the corners of the perimeter.

In some embodiments, the shape-packing (e.g., circle-packing) can include incorporating the physical field using at least one of tailored sectioning, field-based smoothing, and a combination of tailored sectioning and field-based smoothing.

In some embodiments, the method can include the additive manufacturing printer being in communication with the computer system. The printer can be at least one of a big area additive manufacturing (BAAM) printer and a small-scale additive manufacturing printer. The printing can include using a nozzle diameter in a diameter in a nozzle-diameter range of 0.05" to 0.2". The printing can include extruding material including at least one of a plastic, a fiber composite, a ceramic, and a metal. The article being printed can be one of a wing, a propeller blade, a turbine blade, a beam, or a toe of an excavator cup.

In some embodiments, the conversion to additive manufacturing instructions for printing the respective structure embodying the corresponding simulated infill lattice structure in the infill portion of the article includes generation of G-Code for movement of an additive manufacturing printer head along a toolpath and extrusion of a material including at least one of a plastic, a fiber composite, a ceramic, and a metal, from the printer head along the toolpath.

In some embodiments, execution of the slicer software program to generate the additive manufacturing instructions includes simulation of shape packing additional planar regions representative of different infill layer portions of the article, simulation of generation of additional intermediate lattice structures based on the shape packing of the additional planar regions, simulation of generation of additional infill lattice structures based on the intermediate lattice structures, and translation of the additional simulated infill lattice structures to additional additive manufacturing instructions for printing, by an additive manufacturing printer, additional respective physical infill lattice structures embodying the corresponding additional simulated infill lattice structures as additional infill portions of the article.

In general, another innovative aspect of the subject matter described in this specification can be embodied in a computer method of generating additive manufacturing instructions for an object using tailored sectioning. The computer method can include accessing, with a computer system from memory, object geometry data representative of geometry of the object. The method can include slicing, with a slicer software program executed by a computer system, the object geometry data into layer data representative of layers of the object, at least one of the layers including an object layer boundary and an object layer infill region. Accessing, with a computer system from memory, field intensity values corresponding to a non-uniform scalar field distribution over the object layer infill region. Accessing, with a computer system from memory, a tailored sectioning parameter indicative of a mapping between the field intensity values and two or more circle sizes. Circle packing, with a circle packing program executed by a computer system, the object layer infill region with packing circles to define a circle-packed infill region, wherein a first subset of packing circles are sized as one of the two or more circle sizes and a second subset of packing circles are sized as a different one of the two or more circle sizes by the circle packing program according to (i) the field intensity values of the non-uniform scalar field distribution over the object layer infill region at positions of the packing circles; and (ii) the tailored sectioning parameter indicative of the mapping between the field intensity values and the two or more circle sizes. The method can also include triangulating, with a triangulation program executed by a computer system, the packing circles in the object layer infill region to generate an intermediate graph of triangular cells such that vertices of a triangular cell correspond to centers of three adjacent packing circles of the circle-packed infill region, and dual graphing, with a dual graph program executed by a computer system, the intermediate graph of triangular cells in the object layer infill region to generate a non-uniform section tailored lattice grid in the object layer infill region including two or more uniform sections of hexagonal lattice patches of different sizes corresponding to the tailored sectioning parameter, and one or more transition zones between the two or more uniform sections of different sized hexagonal lattice patches including irregular polygons that provide a continuous interface between at least two of the two or more uniform sections of hexagonal lattice patches of different sizes. The method can also include converting the non-uniform section tailored lattice grid to additive manufacturing instructions for printing, by an additive manufacturing printer, a respective physical non-uniform section tailored infill lattice structure embodying the non-uniform section tailored lattice grid for the object layer infill region, and storing the additive manufacturing instructions in memory.

The foregoing and other embodiments can each optionally include one or more of the following features, alone or in combination. In particular, one embodiment includes all the following features in combination.

In some embodiments, the physical non-uniform section tailored lattice is a modified honeycomb lattice having patches of uniform hexagonal cells of different side lengths connected by the transition zone of irregular polygonal cells, such that the patches of uniform hexagonal cells with different side lengths have side lengths that correspond to different threshold intensity values of the non-uniform scalar field distribution over the object layer infill region. The one or more transition zones disposed between the patches can have polygonal cells with 4, 5, 7, or 8 sides.

In some embodiments, circle-packing the object layer infill region further includes placing boundary circles on a perimeter of the object layer infill region. The perimeter can have corners, and the circle-packing of the object layer infill region further includes pinning particular boundary circles to the corners of the perimeter.

In some embodiments, circle-packing the object layer infill region includes incorporating the physical field using field-based smoothing in addition to tailored sectioning.

In some embodiments, printing the structure embodying the non-uniform section tailored infill lattice structure includes extruding material including at least one of a plastic, a fiber composite, a ceramic, and a metal.

In general, another innovative aspect of the subject matter described in this specification can be embodied in a computer method of generating additive manufacturing instructions additively manufacturing an object using a field-based smoothing heuristic. The method can include accessing, with a computer system from memory, object geometry data representative of geometry of the object, slicing, with a slicer software program executed by a computer system, the object geometry data into layer data representative of layers of the object, at least one of the layers including an object layer boundary and an object layer infill region. The computer method can also include accessing, with a computer system from memory, field intensity values corresponding to a non-uniform scalar field distribution over the object layer infill region, accessing, with a computer system from memory, a field-based smoothing parameter indicative of a mapping between the field intensity values and two or more circle sizes, circle packing, with a circle packing program executed by a computer system, the object layer infill region with packing circles to define a circle-packed infill region, wherein the packing circles are positioned and sized with respect to the object layer infill region by the circle packing program according to a plurality of field-based smoothing heuristic constraints including (i) neighboring packing circles are substantially tangent, and at least one of (ii) a subset of packing circles are boundary circles that lie along a perimeter of the object layer infill region; and (iii) size of the packing circles at positions in the object layer infill region correspond to field intensity values from the non-uniform scalar field distribution at the same positions in the object layer infill region, wherein the circle packing program iteratively adjusts positions and sizes of the packing circles to search for an equilibrium that causes the circle-packed infill region to at least partially satisfy the field-based smoothing heuristic constraints. The computer method can also include triangulating, with a triangulation program executed by a computer system, the circle-packed infill region to generate an intermediate graph of triangular cells such that vertices of a triangular cell correspond to centers of three adjacent packing circles of the circle-packed infill region, dual graphing, with a dual graph program executed by a computer system, the intermediate graph of triangular cells in the object layer infill region to generate a non-uniform field-smoothed lattice grid of hexagonal cells, such that sides of a hexagonal cell correspond to segments between centers of adjacent triangles of the intermediate lattice, converting the non-uniform field-smoothed lattice grid to additive manufacturing instructions for printing, by an additive manufacturing printer, a respective physical non-uniform field-smoothed infill lattice structure embodying the non-uniform field-smoothed lattice grid for the object layer infill region, and storing the additive manufacturing instructions in memory.

The foregoing and other embodiments can each optionally include one or more of the following features, alone or in combination. In particular, one embodiment includes all the following features in combination.

The computer method can include where the physical non-uniform field-smoothed lattice structure is a modified honeycomb lattice including at least a subset of neighboring hexagonal cells that smoothly transition from one side length to a different side length. The field-based parameter can be a step size indicative of an amount of change at each iterative adjustment to circle size, circle position, or a combination thereof.

In some embodiments, circle-packing the object layer infill region further includes pinning particular boundary circles to corners of the object layer boundary.

In some embodiments, circle-packing the object layer infill region includes incorporating the physical field using tailored sectioning in addition to field-based smoothing.

Printing the structure embodying the non-uniform field-smoothed infill lattice structure can include extruding material including at least one of a plastic, a fiber composite, a ceramic, and a metal.

In general, another innovative aspect of the subject matter described in this specification can be embodied in a method for fabricating an article, the article configured to experience, during operation of the article, a physical field having a non-uniform intensity over the extent of the article. The method can include generating, by a computer system, representations of layers of the article, each layer comprising an infill portion, wherein a representation of each layer's infill portion comprises a corresponding a molecular dynamically generated lattice having cells. Generating the molecular dynamically generated lattice for a corresponding layer's infill portion can include the following steps: (i) obtaining an initial node distribution over the extent of the infill portion of the layer, (ii) force balancing the spacing between the nodes in the initial node distribution toward a force balance equilibrium to generate a force balanced node distribution, wherein the force balance equilibrium is adjusted based on the physical field having the non-uniform intensity, (iii) computing an intermediate lattice having triangular cells, such that vertices of a triangular cell correspond to three adjacent nodes of the force balanced node distribution, and (iv) computing the molecular dynamically generated lattice having polygonal cells with 4 to 8 walls, such that sides of a polygonal cell correspond to segments between centers of adjacent triangles of the intermediate lattice. In addition, for each layer of the article the method can include printing, by an additive manufacturing printer in communication with the computer system, a respective structure embodying the corresponding molecular dynamically generated lattice in the layer's infill portion.

In some embodiments, the molecular dynamically generated lattice is a graded honeycomb lattice having hexagonal cells of different side lengths, such that smaller side lengths correspond to high values of the physical field and larger side lengths correspond to low values of the physical field. Obtaining the initial node distribution over the extent of the infill portion of the layer can include selecting the number of nodes and generating an initial node distribution based on the selected number of nodes. Generating the initial node distribution based on the selected number of nodes can include spreading the nodes over the extent of the infill portion of the layer such that spacing between nodes is one of at least random and regular.

In some embodiments, obtaining the initial node distribution over the extent of the infill portion of the layer includes distributing at least a portion of nodes onto a boundary of the infill portion of the layer. The method can include pinning at least a portion of nodes onto the boundary of the infill portion of the layer such that force balancing spacing includes changing spacing between nodes by adjusting unpinned node positions without adjusting pinned node positions.

In some embodiments, the additive manufacturing printer in communication with the computer system is at least one of a big area additive manufacturing (BAAM) printer and a small-scale additive manufacturing printer. The physical field can be at least one of a stress field and a temperature field. Printing the structure embodying the lattice can include extruding material including at least one of a plastic, a fiber composite, a ceramic, and a metal.

In some embodiments, a force-balanced spacing node distribution corresponds to a Lennard Jones potential modified by a stress factor of the physical field.

In general, another innovative aspect of the subject matter described in this specification can be embodied in a slicer computer system for additive manufacture of an article. The system can include memory configured to store (i) surface data representative of a surface of the article, (ii) field data representative of intensity values of a non-uniform physical field corresponding to the article; (iii) a slicer software program; and (iv) additive manufacturing instructions for the article. The system can include a processor in communication with the memory. The processor can be configured to execute the slicer software program stored in memory to convert surface data and field data of the article into additive manufacturing instructions for fabricating a non-uniform infill lattice structure for the article. Execution of the slicer software program to generate the additive manufacturing instructions includes (i) simulation of positioning a plurality of nodes over a planar region representative of an infill layer portion of the article, (ii) simulation of adjusting the spacing of the plurality of nodes within the infill layer portion of the article wherein adjustments are based on intensity values of the non-uniform physical field at corresponding locations in the planar region representative of the infill layer portion of the article, (iii) simulation of generation of an intermediate lattice structure having a set of intermediate lattice polygonal cells, wherein vertices of the intermediate lattice polygonal cells correspond to neighboring nodes of the plurality of nodes and wherein sides of the set of the intermediate lattice polygonal cells correspond to segments between the vertices of the set of intermediate lattice polygonal cells, (iv) simulation of generation of the infill lattice structure having a set of infill lattice polygonal cells, wherein vertices of the infill lattice set of polygonal cells correspond to centers of adjacent intermediate lattice polygonal cells of the intermediate lattice and wherein sides of the infill lattice polygon cells correspond to segments between the vertices of the infill lattice polygon cells, (v) conversion of the infill lattice polygonal cells of the simulated infill lattice structure to additive manufacturing instructions for printing, by an additive manufacturing printer, a respective physical infill lattice structure embodying the corresponding simulated infill lattice structure as the infill layer portion of the article, and (vi) storing the additive manufacturing instructions in memory.

The foregoing and other embodiments can each optionally include one or more of the following features, alone or in combination. In particular, one embodiment includes all the following features in combination.

In some embodiments, the simulated infill lattice structure is a graded honeycomb infill structure having hexagonal cells of different side lengths, such that side lengths corresponds to intensity values of the non-uniform physical field.

In some embodiments, the spacing of the plurality of nodes corresponds to a Lennard Jones potential modified by a stress factor of the physical field. The modified Lennard Jones potential can satisfy the following equation, $V=4e[(\sigma/r)^p-\alpha(\sigma/r)^q]$, where r is the distance between adjacent nodes, and $\alpha$ is a stress factor corresponding to the non-uniform intensity distribution over the extent of the article of the physical field. The p can be 8 and the q can be 6.

In some embodiments, simulation of adjusting the spacing of the plurality of nodes further includes placing boundary shapes (e.g., circles) on a perimeter of the infill portion. The perimeter can includes corners, and simulation of adjusting the spacing of the plurality of nodes can include pinning user-selected boundary shapes on the perimeter and to the corners of the perimeter.

In some embodiments, the intensity values of the non-uniform physical field are representative of at least one of a stress field and a temperature field expected to be experienced over the extent of the article.

In some embodiments, the conversion to additive manufacturing instructions for printing the respective structure embodying the corresponding simulated infill lattice structure in the infill portion of the article includes generation of G-Code for movement of an additive manufacturing printer head along a toolpath and extrusion of a material including at least one of a plastic, a fiber composite, a ceramic, and a metal, from the printer head along the toolpath Accordingly, the present disclosure provides a simple and effective way to generate non-uniform infill based on a functional condition, such as simulated, experimental, or expected internal stress under loading of the article being additively manufactured.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 11 illustrates an exemplary un-deformed graph and corresponding dual graph.

FIG. 12 illustrates an exemplary deformed graph and corresponding dual graph.

FIGS. 13A-B illustrate an exemplary perspective view of a large-scale additively manufactured domain area in accordance with an embodiment of the present disclosure as well as a stress field associated with the same domain area.

FIG. 19 illustrates screenshots of representative visualizations of another initial node distribution and an output node distribution after force balancing is applied to the initial node distribution.

FIGS. 21A-C illustrates another example of molecular dynamics based infill generation beginning with a field integrated node distribution.

DESCRIPTION OF THE CURRENT EMBODIMENTS

The present disclosure is generally directed to systems and methods for generating non-uniform lattice structures. The non-uniform lattice structures can be utilized in systems and methods for fabricating an article using additive manufacturing, small-scale and large-scale.

Figure 1:
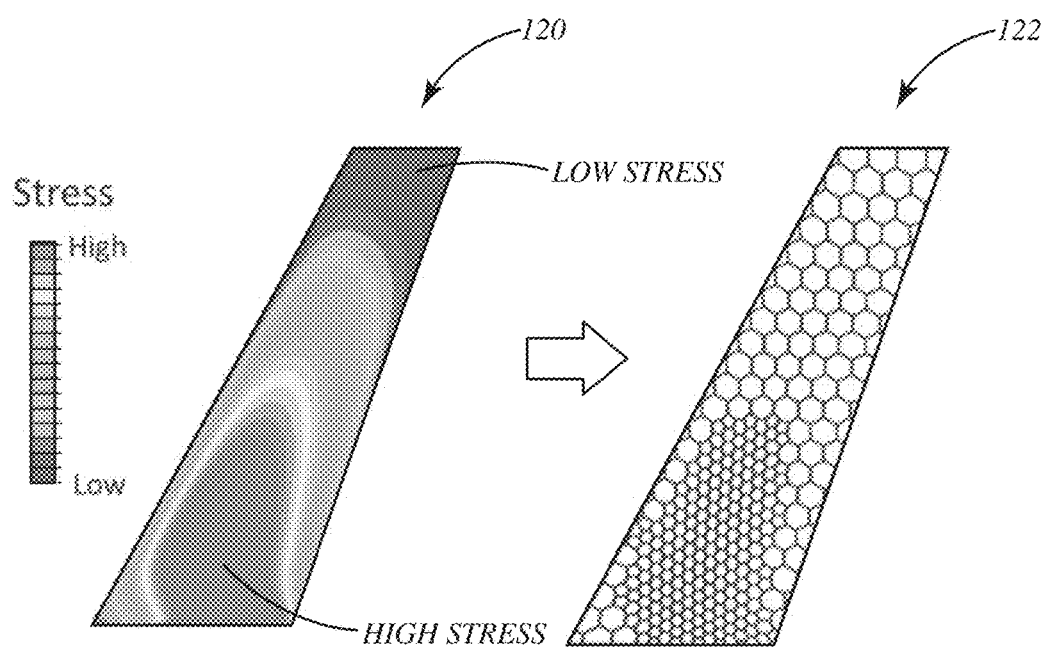
FIG. 1 shows a non-uniform, graded infill structure generated based on internal stress under loading in accordance with an embodiment of the present disclosure.

One aspect of the present disclosure is generally directed to systems and methods of fabrication of a non-uniform lattice infill with variable unit size based on a physical field (e.g., a stress field or a thermal field) that corresponds to the article being fabricated. That is, the unit size of cells of the lattice over the extent of the article varies with the intensity of the physical field. For example, depending on the type of physical field and the application, higher intensity field values generally correspond to smaller unit size lattice cells and lower intensity field values generally correspond to larger unit size lattice cells, or vice versa. One example of such a non-uniform, graded infill structure fabricated in accordance with a method of the present disclosure is illustrated in FIG. 1. Additive manufacturing instructions to fabricate the non-uniform, graded infill structure can be generated based on a functional condition embodied in a field (e.g., a field indicative internal stress under loading).

One aspect of the present disclosure is generally directed to systems and methods for combining multiple uniform lattices that have two or more different lattice unit cell sizes to generate a linked non-uniform lattice structure, i.e., a lattice structure with multiple different lattice unit cell sizes having a suitable linkage in-between. The linkage connects the edges of multiple different lattice patches having uniform unit cell sizes that do not naturally align by generating a transition lattice patch that systematically and robustly transitions between the different unit cell sizes. For example, systems and methods of the present disclosure can generate a non-uniform lattice structure that includes a transition patch that transitions from a first uniform lattice patch having a first unit cell size to a second lattice patch having a second unit cell size different from the first unit cell size. FIG. 1 shows an exemplary representation. Specifically, it depicts an additive manufacturing layer toolpath 122 generated based on an internal stress field 120 that can be utilized to fabricate a layer of the infill structure of an article, in this case an airplane wing. The particular stress field depicted is exemplary and can vary from application to application. In FIG. 1, higher stress values (e.g., in Mises) are generally toward the bottom portion of the article while lower stress values are toward the top of the article with intermediate stress values over a gradient between.

Figures 2A, 2B, 2C:
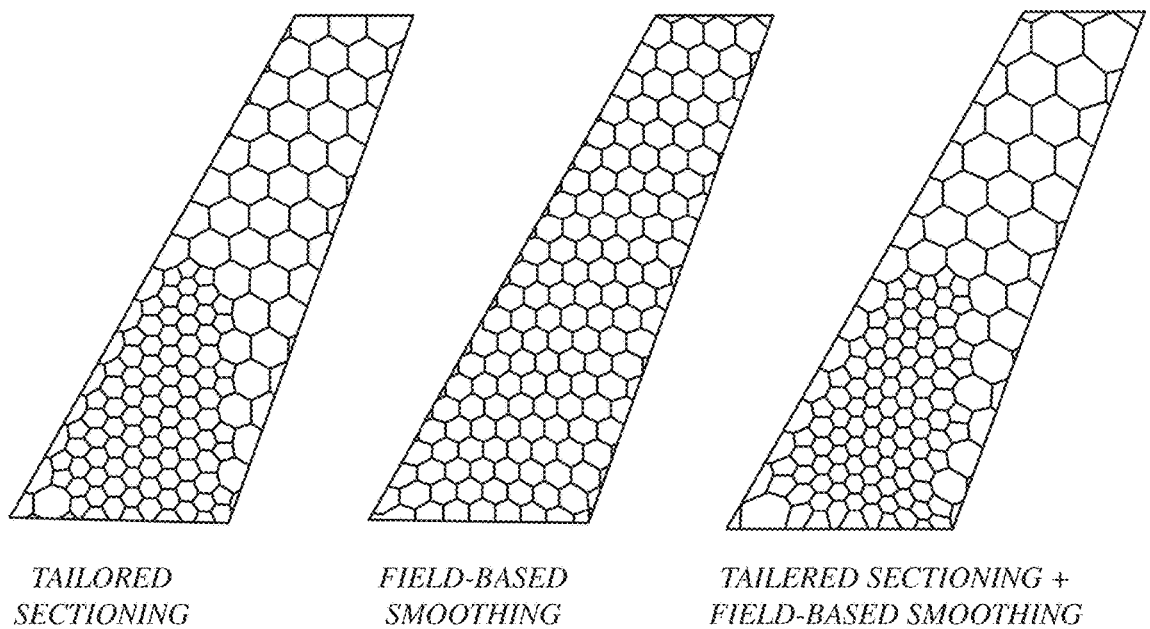
FIGS. 2A-C illustrate exemplary non-uniform, graded infill structures generated with different embodiments of the present disclosure.

FIGS. 2A-C illustrate top plan views of exemplary infill structures for additively manufactured articles. Some embodiments of the present disclosure are directed to systems and methods for tailored sectioning to fabricate a section tailored infill structure for an article (see, for example FIG. 2A), some are directed to systems and methods for field-based smoothing to fabricate a field-smoothed infill structure for an article (see, for example FIG. 2B), and some embodiments are directed to a combination of tailored sectioning and field-based smoothing to fabricate an infill structure for an article that is both section tailored and field-smoothed (see, for example FIG. 2C). A field-tailored lattice can refer to a section tailored lattice, a field-smoothed lattice, a section tailored and field-smoothed lattice, or a lattice generated by another methodology that integrates a field into the infill generation process. For example, a field-tailored lattice may refer to a lattice that is fabricated via additive manufacture by tailored sectioning. a lattice that is fabricated via additive manufacture by field-based smoothing, a lattice that is fabricated via additive manufacture by essentially any lattice generation technique that integrates a field into the infill generation process to generate a non-uniform, graded infill structure, or any combination of such systems and methods.

Figure 3:
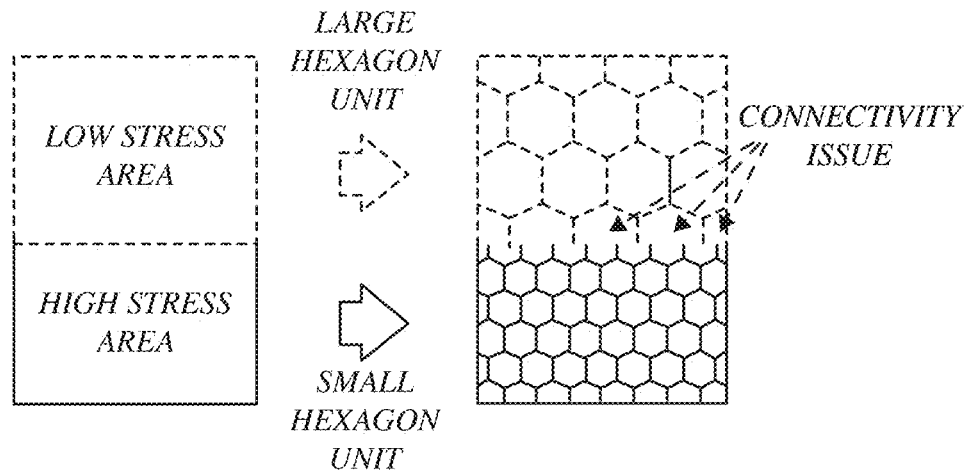
FIG. 3 illustrates a connectivity issue of non-uniform infill generation addressed by embodiments of the present disclosure.

Tailored sectioning, field-based smoothing, and combinations thereof refer to modified circle packing algorithms that ensures connectivity between two non-uniform lattice structures at their interface. That is, these systems and methods can generate non-uniform lattice structures with guaranteed connectivity that address the connectivity issues that can arise when polygon sizes are adapted based on field intensities. For example, FIG. 3 illustrates how simply changing the relative size of hexagons in an infill pattern results in a connectivity issue. Systems and methods of the present disclosure can generate transition lattice patch linkages that provide a continuous transition interface between multiple different non-uniform lattice structures, which addresses this connectivity issue.

In tailored sectioning, the sizes of the packing shapes are varied according to a tailored sectioning parameter. The tailored sectioning parameter is indicative of a mapping between a discrete number of packing shape sizes (e.g., packing circle radii) and field data (e.g., intensity value of a physical field over a region). Thresholding can divide the region into sections that have patches of regular polygons tailored to different uniform sizes. The number of discrete polygon sizes can vary from application to application by adjusting the thresholding. Thresholds can be user-selectable, pre-defined in memory, or automatically configured by a processor, e.g., based on the nature of the field data, the standard deviation or another statistical characteristic of the field data, or essentially any other characteristic of the field data.

Figure 5:
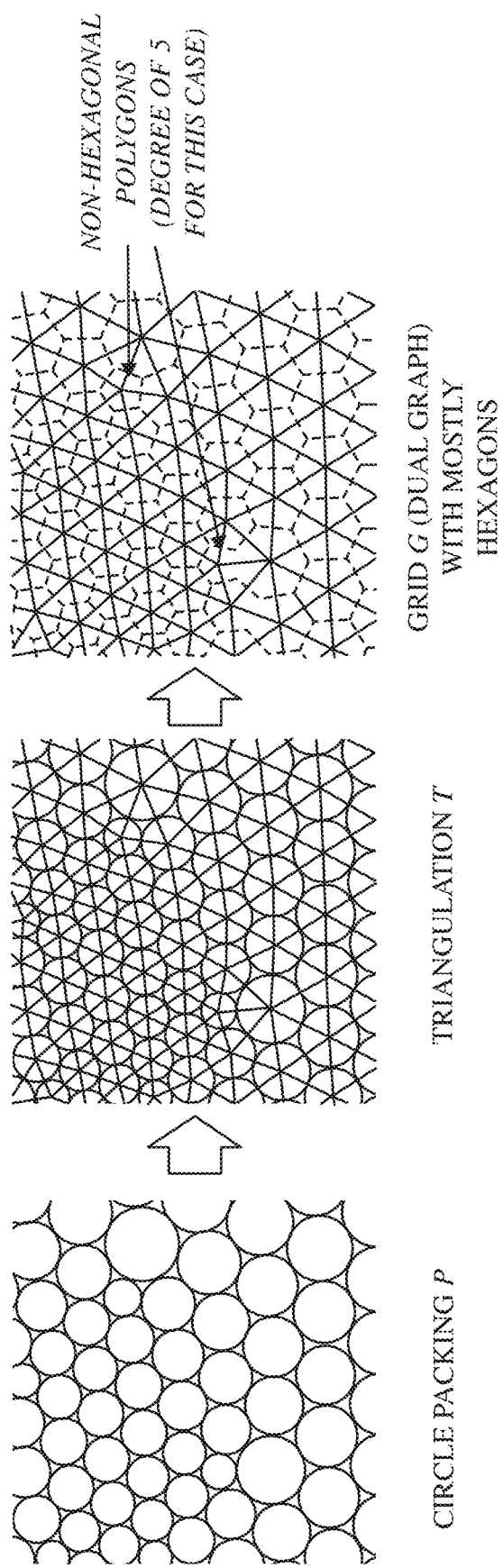
FIG. 5 illustrates a non-uniform circle packing yielding irregular triangulation converted to a non-uniform polygonal lattice grid.

That is, by tailoring the sizing of the packing shapes based on the field intensity into several discrete sizes, the resultant grid will automatically form multiple uniform sections of regular polygons with transitions between the sections of different sized polygons including irregular polygons that ensure a continuous interface between sections. An example of a section tailored infill structure is shown in FIG. 5, and discussed in more detail below.

The tailored sectioning method generally produces an embedded complex with discrete changes in edge lengths based on the underlying field. Field-based smoothing provides a heuristic for obtaining a more continuous change in cell size that is influenced by the field data. In essence, field-based smoothing attempts to embed each vertex of the complex as a circle with a radius that is determined from the field data in such a way that neighboring circles are tangent. For stress fields, regions of higher stress produce circles of smaller radius in order to create a denser grid, while regions of lower stress produce circles of larger radius. The mapping of stress (or other field data) to radii can be defined by the user. In some applications the maximum stress can be mapped to a user set minimum radius, the minimum stress to a user set maximum radius, and values in-between can be determined by a processor executing a linear interpolation or other methodology for intermediate values.

Embodiments of the present disclosure can also involve placing boundary circles onto the boundary of a user-defined (or CAD/slicer defined) polygon, e.g., such that each circle center corresponds to a boundary vertex that lies on the boundary polygon. That is, systems and methods of the present disclosure can constrain the circle packing and ultimately the infill structure generated to a particular boundary, such as the infill or surface boundary of the part being additively manufactured.

Some embodiments of the field-based smoothing heuristic provide the following constraints: (1) that neighboring circles be tangent, (2) that boundary circles lie on the boundary of a polygon, and (3) that radii conform to the specified field. In this way, field-based smoothing is significantly over-constrained. In alternative embodiments, just (1) and (2) or (1) and (3) together are sufficient to provide a variant heuristic. In essence, the field-based smoothing heuristic involves treating the network similar to a spring network and iteratively searching for an equilibrium to allow partial satisfaction all of the constraints. The equilibrium criteria can vary from application to application. In some embodiments, it may be desirable to ensure about equal satisfaction among all criteria in order to spread errors fairly evenly across the network, which ultimately can result in an improvement in static load bearing or other metrics of a 3D printed article. In other embodiments, certain constraints can be weighted higher or lower than others such that the equilibrium point is skewed toward a particular constraint(s).

Details regarding various exemplary embodiments of these aspects of the present disclosure are discussed in detail below in connection with systematic generation of lattice structures and applications to small and large-scale additive manufacturing.

Some embodiments of the present disclosure are generally directed to a system and method to generate a non-uniform graded polygonal structure, or representation in memory thereof, based on a selected field that defines one or more regions having a particular effect (e.g., multiple regions with different levels of internal stress or different thermal levels). For example, some embodiments provide a non-uniform, graded honeycomb structure based on a given field (e.g., an internal stress profile or a thermal profile).

Some embodiments of the present disclosure are generally directed to a non-uniform graded polygonal structure that is locally scaled according to a field to accommodate different size meshes. For example, one embodiment can generate an infill structure with a coarse mesh corresponding to a low stress area and a fine mesh corresponding to a high stress area. However, attaching a coarse mesh to a fine mesh presents a connectivity issue at the interface between the two different lattices because they are not guaranteed to align. This can be addressed by locally scaling the size of the mesh at the interface. For example, the structure can include multiple different size meshes and the various embodiments of the system and method ensure satisfactory connectivity between the different sized meshes. In one embodiment, the non-uniform, graded polygonal structure is scaled to two different size meshes, a coarse mesh and a fine mesh.

The systems and methods of the present disclosure can generate additive manufacturing instructions, e.g., G-Code, which can be provided to a 3D printer to additively manufacture a part or article that includes a non-uniform lattice structure. As an example, an airplane wing with a non-uniform lattice infill structure can be manufactured according to various embodiments of the present disclosure.

Infill Lattice Generation

Figure 4:
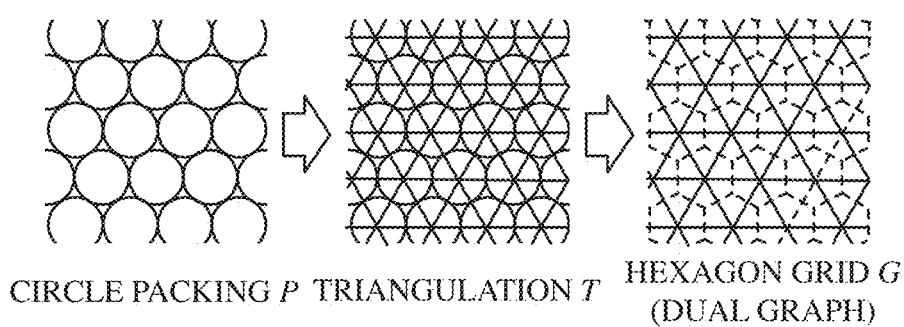
FIG. 4 illustrates a uniform circle packing yielding a regular triangulation converted to a uniform hexagonal lattice grid.

A configuration of tangent circles yields a contact graph T by connecting the centers of tangent circles with straight line segments. The embodiments of the present disclosure systematically and robustly generate circle packings whose contact graphs T form triangulations fitted to prescribed two-dimensional regions. The graph T can be converted to its dual graph, denoted G, by connecting centers of adjacent triangles of T with straight line segments. G is trivalent, meaning that each vertex belongs to three edges. An example of this is illustrate in FIG. 4, which shows how a packing by uniform sized circles yields a regular triangulation T that then generates a dual graph G, in this case, a regular hexagonal grid. When the circles of the packing are not of uniform size, the nature of the resulting grid G changes. For example, perhaps as best shown in FIG. 5, a non-uniform circle packing P yields a non-regular triangulation T that converts to a grid G which is honeycomb-like, with mostly hexagonal cells, but with cell side counts in the range 5-7 (and occasional 4's or 8's). Accordingly, by adjusting the circle packing, the resulting lattice G remains connected and trivalent, but the sizes of its cells vary based on the sizes of the circles.

Some embodiments of the present disclosure, such as tailored sectioning embodiments (see FIG. 2A), field-based smoothing embodiments (see FIG. 2B), and combined tailored sectioning and field-based smoothing embodiments (see FIG. 2C), involve modifications of circle packing techniques and their application to additive manufacturing toolpaths. That is, a grid G can be constructed for an infill structure that has a honeycomb appearance because they are all obtained as the duals to circle packings. The circles form mutually tangent trips, meaning that connecting the centers of tangent circles yields a triangulation T, as appears in FIG. 5. The hexagonal grid G is realized as the dual graph to T. Embodiments of the present disclosure are generally directed toward the construction and manipulation of the circle packings P, to extract a grid G.

One familiar (circle) packing is the hexagonal or "penny" packing, involving circles of uniform radius, each surrounded by six tangent neighbors. Such a circle packing is mentioned above and illustrated in FIG. 4. Packings of the present disclosure display more variety but retain the feature that the circles come in mutually tangent triples. In embodiments of the present disclosure, P denotes a packing, meaning a collection $P=\{C_v\}$ of circles in a plane with the property that when we connect the centers of tangent circles in P we obtain a planar triangulation graph. The graph is termed the "triangulation" for P and denoted $T=T(P)$. For each vertex v of T, there is a corresponding $C_v$ in P. Write v~w if v and w share an edge in T, meaning $C_v \sim C_w$, i.e., that $C_u$ and $C_w$ are tangent. The dual graph, denoted $G=G(P)$, is our real target. In the case of uniform hexagonal packings, for instance, G is a honeycomb pattern of six-sided cells.

Combinatorics will generally not be hexagonal. If V, E, and F denote the number of vertices, edges, and faces of the triangulation T, the Euler characteristic $\lambda(T)=V-E+F$ will always be one, meaning T triangulates a topological disc. "Boundary" vertices and edges are those on the periphery of T, denoted $T_\partial$, while the other vertices and edges are termed "interior," denoted $T_{int}$. Denote by $N(v)$ the set of neighbor vertices of v, $N(v)=\{u: u\sim v\}$. The degree of v, $deg(v)$, is the cardinality of $N(v)$. In the hexagonal case, $deg(v)=6$ for all $v \in T_{int}$, but in general, degrees will fall in the range 5-7, with the preponderance being 6 and with occasional 4's and 8's.

To compute a packing $P=\{C_v\}$, a processor computes $R=\{r_v\}$, the associated radii of the circles, and $Z=\{z_v\}$, the associated circle centers. It may be counterintuitive, but the process starts with triangulation T. The processor then computes the radii $r_v$, typically taking the radii of vertices in the boundary as initial data. Finally, with the combinatorics and the radii in memory, the processor can successively compute circle centers $z_v$. Standalone packing engines are readily available and can handle simple and complex packings alike.

Although some embodiments of the present disclosure leverage the circle packing paradigm, the constructions involve compromises. Typical boundary conditions involve boundary radii, centers, and/or boundary angle sums. In certain embodiments, a border may or may not be included around a shape, and if included, it may be defined irrespective of the interior grid. Also, as sizes are modified as part of tailored sectioning (see below), tangency compromises can be made by bringing in "inversive distance" parameters.

In general, each cell of the grid G roughly circumscribes the associated circle of the packing P. Accordingly, these cells are "almost round" rather than distorted. The number of edges of the cell associated with v is $deg(v)$.

As T is a triangulation, the circles of the packing P form triples. This means that the corners of the cells of the grid G are triple points, points incident to three edges. This and the fact that these edges meet with roughly equal angles, can provide clear structural advantages.

There is a mathematical rigidity attached to the packing P. For example, in the infinite hexagonal case, every circle of the packing P must have the same radius—if one radius of its packing P is changed, it is impossible to compensate with other radii adjustments to maintain a hexagonal circle packing in a way that is not simply a scaled/translated/rotated version of the original packing. Although the embodiments of the present disclosure deal with practical finite and non-hexagonal triangulations, this notion of rigidity persists: One manipulates packings for triangulation T by manipulating boundary conditions, but once those boundary conditions are set, the geometry of the packing P (and hence, the geometry of the grid G) is uniquely determined.

Each cell of the grid G is associated with a single number, the radius of its circle. This makes for easy computations and avoids degeneracies and accounts for the "conformal" nature exhibited by circle packings.

Tailored Sectioning Infill Lattice Generation

A region Ω in an x, y-plane is presented, for which an infill grid G is desired. The grid G can be obtained by generating a circle packing P in region Ω and extracting the grid G as its dual grid. From the circle packing P an underlying triangulation T can be obtained, for example, for use in subsequent field-based smoothing. Optionally, elements may be included in the circle packing P, triangulation T, and grid G associated with the boundary of the region Ω.

One goal of tailored sectioning is to accommodate additional constraints on the grid G represented by a scalar field to which the grid G responds. This field, specified by a non-negative function $f(x,y)$ on the region Ω, may represent a distribution of stress, weight, or some other physical property that varies across the region Ω. Put another way, one goal of tailored sectioning is to align the granularity of the grid G with the values of $f$: where $f$ is larger, the cells of G should be smaller and vice versa. This can be accomplished by configuring a processor to adjust the granularity of the circle packing P.

In a simple case where $f$ is essentially constant, the circle packing P can be created by cookie-cutting the shape of the region Ω out of regular hexagonal circle packing of the plane. Such a case is essentially illustrated in FIG. 4. The processor can be configured to accept a selection from a user interface as to a common radius of the circles and relative position of the circles within the region Ω to optimize the circle packing P—for instance, so that a row of its circles lies along a given edge of the region Ω. Circles lying along a given edge of the region Ω can include lying tangent the edge of the region, lying such that the center of the circles lie on the edge of the region, or essentially any other configuration where the circles either overlap the edge of the region or are in close proximity to the edge of the region. In some embodiments the circles can be packed to lie along the edge of the region in substantially the same manner, in other embodiments the circles can be packed such that they lie along the edge of the region in different manners.

In other cases, the values of $f$ will vary across the region Ω. The circle packing P can be generated out of circles that vary in radius. For example, the circles of the circle packing P can be smaller where the magnitude of the field $f$ is larger and vice versa. Examples of this are represented in FIG. 1 and FIGS. 9A-D. This can be accomplished while maintaining or substantially maintaining local uniformity to the extent possible, by utilizing a limited number of distinct radii for the circles so that the circles of the packing P form local hexagonal patches. And, due to using a limited number of distinct radii, the grid G will have generally uniform cells within the local patches, but irregular cells in the transition zones between patches.

This system and method of tailored sectioning provides flexibility that is not present in conventional lattice generation. The method can be described as a series of steps including: obtaining a field function $f$ that maps a region it into an interval $[a, b] \subset \mathbb{R}^+$, selecting a number m of decreasing values $b=f_0>f_1>f_2>\ldots>f_{m-1}>f_m=a$, selecting increasing radii $0<r_1<r_2<\ldots<r_{m-1}<r_m$ where $r_1$ and $r_m$ represent the radii of the largest and smallest circles, respectively, permitted in the circle packing P, and selecting a micro-lattice parameter s and a micro-lattice $M=M(s)$. Here $s>0$ is such that each circle radius $r_j$ is roughly equal to an integer multiple $n_j$ of s. For example, given $\in>0$, the processor can be configured to select s suitably small that there will exist integers $0<n_1<n_2<\ldots<n_m$ with $|n_j s - r_j|<\in r_j$, $j=1,\ldots,m$. The associated micro-lattice $M=M(s)$ is a regular hexagonal lattice with lattice spacing $2s$ (the distance between neighboring lattice points), with a convenient orientation and juxtaposed with the region Ω. For each integer $n>1$ there are superlattices $M_n$ within M that are regular hexagonal lattices with lattice spacing $n(2s)$. For each j the processor can be configured to select and fix such a superlattice $M_j=M_{n_j}$. This family $\{M_j\}$ of chosen superlattices are held in memory as the basis for construction of the circle packing P. In some embodiments, for j<m, the processor can be configured to include additional circles of radius $r_j$ to help smooth the transition to circles of the next larger radius $r_{j+1}$.

Figure 6:
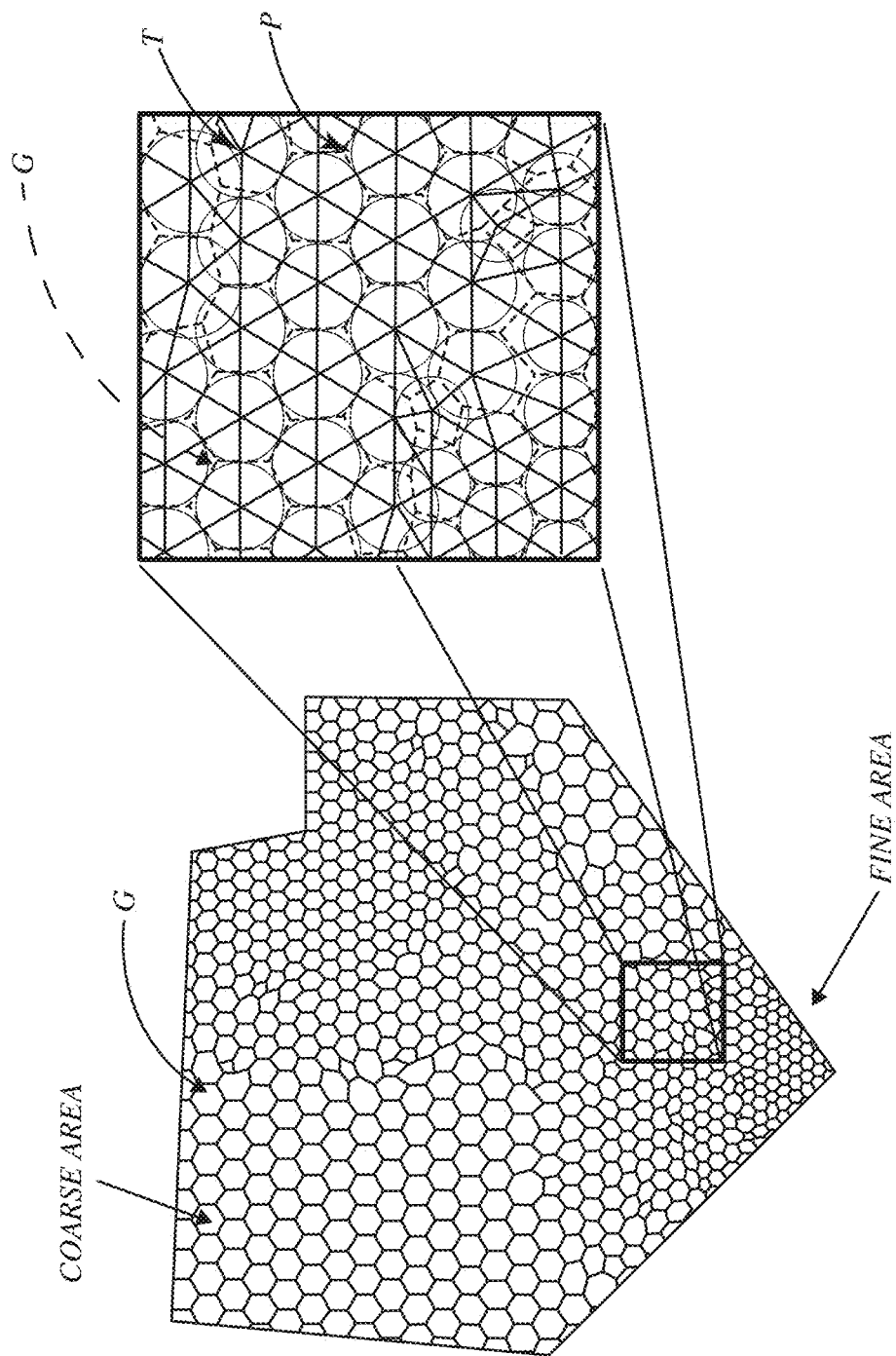
FIG. 6 illustrates an exemplary section tailored infill lattice having a boundary, a coarse area, and a fine area, and a close-up portion illustrating an exemplary transition region.

The nearest neighbor triangulation T of the centers of the circle packing P can be defined. In addition, the grid G can be defined as the concrete dual grid to the circle packing P. Referring to FIG. 6 an example of a grid G, with blowups showing an exemplary triangulation and circle packing P are depicted. The cells of the grid G are locally uniform honeycombs in regions between the field function $f_j$-level sets of the field F. There are irregular cells between those regions, though typically having no less than four and no more than eight sides. Tangency between circles can be generalized to accommodate overlaps or separations between neighboring circles. This can be done with "inversive distance" labels on the edges of T. Further optimization can be obtained with field-based smoothing, which will address irregularities in the cells of the grid, as well as irregularities in cells between the grid and perimeter edges around $\partial\Omega$.

A slicer software program can conduct this process sufficiently fast that a user can cycle through many repetitions with various parameters, such as the micro-lattice parameter s, the field function values $f_j$ and the integers $n_j$, to optimize the grid G. to adjust the total weight of the infill material, to further tailor the gradations of cell size, or to incorporate ad hoc adjustments in local areas.

Field-Based Smoothing Lattice Generation

Figure 7:
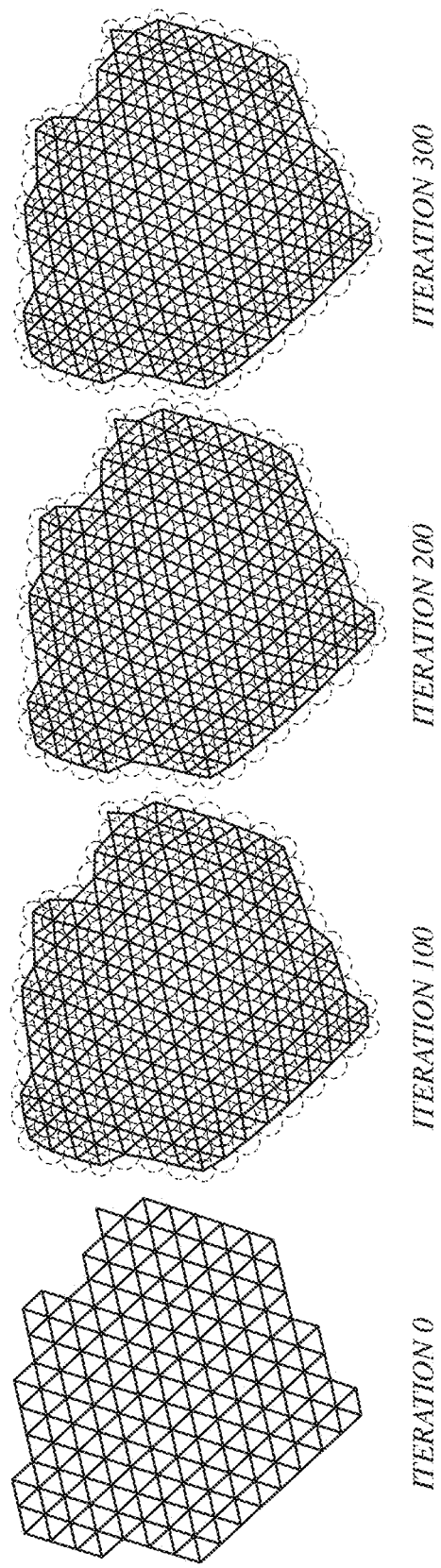
FIG. 7 illustrates exemplary field-smoothed lattices after different numbers of iterations of field-based smoothing.

The tailored sectioning system and method described above can produce an embedded complex with discrete changes in edge lengths based on an underlying field, such as a stress, thermal, or essentially any other specified field. The field-based smoothing is a heuristic for obtaining a more continuous change in cell size that is influenced by the field data. An evolution of a complex starting from an initial planar embedding with radii set to 1 is illustrated in FIG. 7, with the four representations illustrating the state of the packing at iterations 0, 100, 200, and 300.

Field-based smoothing attempts to embed each vertex of the complex as a circle with a radius that is determined from the field in such a way that neighboring circles are tangent. Regions of higher field values (e.g., more stress) produce circles of smaller radius in order to create a denser grid, while regions of lower field values (e.g., less stress) produce circles of larger radius. Although the convention chosen describes higher field values representing more stress and lower field values representing less stress, the mapping of stress to radii can be defined by the user. For example, in some embodiments, maximum stress is mapped to a user set minimum radius, and the minimum stress is mapped to a user set maximum radius, and linear interpolation between the two values provides intermediate stress values. Field-based smoothing can also attempt to place the boundary circles of the disk onto the boundary of a user-defined polygon, meaning that each circle center can corresponding to a boundary vertex that lies on the user-defined polygon.

Summarizing, some embodiments of the field-based smoothing heuristic provide the following constraints: (1) that neighboring circles be tangent, (2) that boundary circles lie on the boundary of a polygon, and (3) that radii conform to the specified field. In this way, field-based smoothing is significantly over-constrained. In alternative embodiments, just (1) and (2) or (1) and (3) together are sufficient to provide a variant heuristic. In some aspects, the field-based smoothing heuristic involves treating the network similar to a spring network and iteratively searching for an equilibrium to allow the field-based smoothing to partially satisfy all of the constraints thereby spreading errors fairly evenly across the network, which ultimately can result in an improvement in static load bearing or other metrics of a 3D printed article.

The rigidity of the circle packing allows implementation of a refinement on the packing that maintains the original constraint of the face angle sum of the boundary vertices in the triangulation. An angle sum is the total angle $\alpha(v)$ around a vertex v, and the constraints on the packing defined by the radii of the boundary vertices can also be formulated by the face angle sums of the boundary vertices. The radii of a subset of the circles in the packing can be changed without altering the constraints of the face angle sums along the boundary.

This rigidity can also lead to unexpected changes in the combinatorics of the packing by slight changes in the boundary conditions imposed. Refinement can be achieved based on simulated field values imposed on the target object or article.

Field-based smoothing can be described in three stages: (1) a description of the heuristic for adjusting a given planar grid embedded with an initial circle set to a nearby configuration in which all neighboring circles are tangent; (2) a description of how to add the constraint of placing vertices on the boundary of the polygon and optionally pinning some vertices to polygon corners; and (3) a description of how to incorporate field values to adjust radii to more densely pack regions of higher values (e.g., higher stress) while still attempting to maintain neighbor tangencies.

Satisfying Neighbor Tangencies

Embodiments of the systems and methods of the field-based smoothing heuristic can generally accept as inputs a complex K (e.g., such as a triangulation T obtained from tailored sectioning) and a packing P together with an initial placement of vertices as circles in a plane. Each vertex v corresponds to a circle $C_v$ centered at p(v) and radius R(v). N(v) denotes a set of neighbors of vertex v in complex K, and edge vector E(v,v')=p(v')−p(v) denotes the edge vector from v to v', and distance d(v,v')=∥E(v,v')∥ denotes the distance between circle centers corresponding to v and v'.

Field-based smoothing works, in general, by first updating the position p(v) and then updating the radius R(v) for each vertex v independently of the other vertices. Consider a vertex v and one of its neighbors v'. The position of a circle C(v) can be corrected by moving it towards C(v') along an imaginary line connecting the two centers p(v) and p(v') until the two circles become tangent. This can be referred to as position correction of $C_v$ towards $C_{v'}$. The position correction is given by $$P(v, v') = \frac{d(v, v') - R(v) - R(v')}{d(v, v')} E(v, v').$$

The process also includes computing a radius correction of $C_v$ towards $C_{v'}$ which is the change in radius to make $C_v$ tangent to $C_{v'}$ without changing its position. The radius correction is given by: ρ(v,v')=d(v,v')−R(v'). Then, in this embodiment of the field-based smoothing heuristic, the processor is configured to compute the average position and radius correction values over all neighbors:

$$P(v) = \sum_{v' \in N(v)} P(v, v'),$$

and $$\rho(v) = \frac{1}{|N(v)|} \sum_{v' \in N(v)} \rho(v, v') - R(v).$$

Finally, in this embodiment, the update in a single iteration to a vertex v's position p(v) and radius R(v) is given by:

$$p(v)_{new} := p(v) + \delta P(v), \text{ and}$$

$$R(v)_{new} := R(v) + \delta \rho(v)$$

The parameter δ is a user-defined value that controls how big the update step is at each iteration. Larger values may become unstable while smaller values will take a larger number of iterations to converge. Some embodiments use δ=0.01.

The iterative heuristic can apply the updates above to each vertex in the complex K. In this embodiment, a total number of iterations can be specified as a user-controlled parameter. FIG. 7 shows an example of field-based smoothing starting with an initial grid with a small initial circle placed at each vertex. The four grids represent an evolution of a complex K starting from an initial planar embedding with radii set to 1. The four images represent the state of the packing at iterations 0, 100, 200, and 300.

Placing Boundary Circles on the Boundary of a Polygon

In the current embodiment of the field-based smoothing, a user can push the boundary circles outwards to the boundary of a user defined polygon with a user interface, such as a mouse or touch screen in communication with the computer performing the field-based smoothing. Alternatively, a processor can be configured to execute a program stored in memory that automatically pushes the boundary circles outward to the boundary of a user-defined polygon according to a set of criteria. Consider a boundary vertex v and let $\widehat{p_v}$ denote the point on the user defined polygon nearest the circle center p(v). $\widehat{p_v}$ can be incorporated as an additional attraction point for the position correction calculation:

$$P(v) = (\bar{p}_v - p(v)) + \sum_{v' \in N(v)} P(v, v'),$$

Figure 8A:
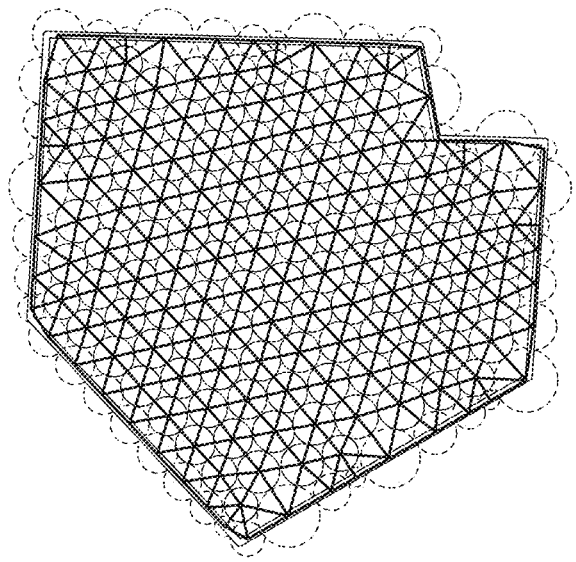
FIGS. 8A-B show an example of boundary circles being placed along an infill boundary and certain vertices being pinned to the corners of that boundary.
Figure 8B:
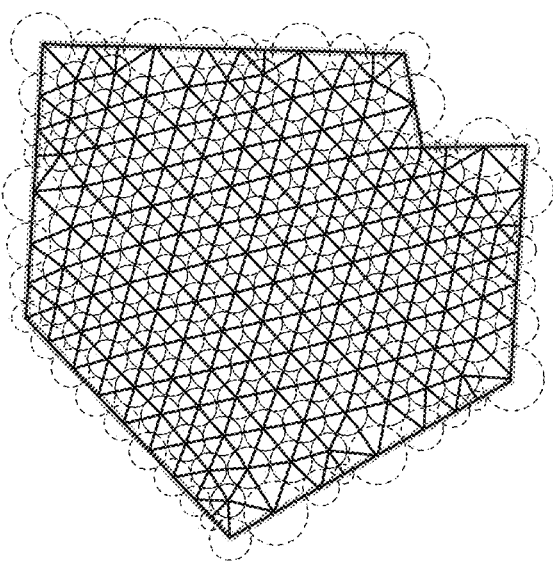

This essentially has the effect of moving the boundary vertices onto the boundary of the polygon. In some embodiments, a user can optionally select a corner of the polygon with a user interface instead of using the nearest polygon point as $\widehat{p_v}$ once for each polygon corner. This has the effect of having the boundary of the final grid match the boundary of the polygon more precisely, perhaps even exactly. FIGS. 8A-B show an example of placing boundary circles on the boundary of an input polygon (FIG. 8A) and with certain vertices pinned to the corners of the polygon (FIG. 8B). Specifically, in FIG. 8A, the boundary circle centers are attracted to the boundary. In FIG. 8B, the boundary circle centers are attracted to the boundary and midway through the computation, the seven circles closest to the seven corners of the polygon are "pinned" to the polygon vertices.

Incorporating the Field Data

Two embodiments of methods for incorporating scalar field data (e.g., scalar stress field data) will now be described and compared in connection with FIG. 9.

For both embodiments, F(p) denotes the value of the scalar field at a particular point p, while the minimum and maximum values are denoted by $$F^- = \min_p F(p)$$

and $$F^+ = \max_p F(p).$$

$R^-$ and $R^+$ denote user specified minimum and maximum desired radii. The processor is configured to associate the minimum field value of $F^-$ with the maximum desired radius $R^+$, the maximum field value of $F^+$ with the minimum desired radius $R^-$, and linearly interpolate between the two for points whose field value F(p) is in-between. Thus, the desired radius function:

$$D(p) = \frac{(F^+ - F(p))(R^+ - R^-)}{F^+ - F^-} + R^-.$$

First Embodiment: To incorporate the field data into the iterative method described above, the radius correction function is altered to $$\rho(v) = \frac{1}{1 + |N(v)|} \left( \left( \sum_{v' \in N(v)} \rho(v, v') - R(v) \right) + (D(p(v)) - R(v)) \right).$$

This incorporates the desired radius as another member of average change. In this embodiment, the desired radius has a small influence on the overall sum. Thus, for a user to weight the desired radius more highly against the neighbor tangency computation, the user has to exaggerate the desired radius computation. This can be done by multiplying $R^+$ by a multiplicative factor larger than 1 or by multiplying $R^-$ by a multiplicative factor between 0 and 1 to force the smaller circles to get even smaller.

Second Embodiment: Another method of achieving a similar effect, which can be incorporated into the lattice generation software is to modify the update to $$\rho(v) = \in (D(p(v)) - R(v)) + (1 - \in) \frac{1}{|N(v)|} \sum_{v' \in N(v)} (\rho(v, v') - R(v)).$$

The user-selected parameter ∈ controls how strongly the heuristic should favor the desired radius over tangency. Since vertices have nearly constant valency these embodiments have a similar effect; however, the first embodiment asks the user to exaggerate the desired radius in a way that may be counter intuitive, while the second embodiment allows the user to simply control how much the desired radius influences the overall computation using a single parameter ∈ which may be more user friendly in practice. A comparison of the two embodiments is illustrated in FIGS. 9A-D on a grid that is influenced by a stress field, but without the boundary polygon constraints from the last section.

Figure 9A:
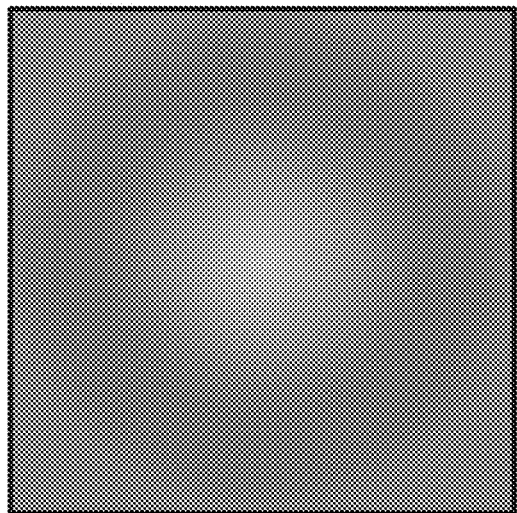
FIGS. 9A-D illustrate exemplary field data and integration of the field data into different field-based smoothing embodiments.

Referring to FIGS. 9A-D, a comparison of the two embodiments for incorporating the stress field is shown. FIG. 9A illustrates the stress field being incorporated with darker shading representing higher stress values (i.e., larger intensity values of field data) and lighter shading representing lower stress values (i.e., lower intensity values of field data). The field data can essentially be taken from any field and stored in memory. It can be obtained by or provided to the processor executing the slicing software program that is configured to generate additive manufacturing instructions for the infill structure. For example, the field data can be simulated, actual, or user-specified. For example, a stress field (or other type of field) can be simulated by an internal stress simulation program that analyzes CAD or other representation of the article being fabricated. As another example, a thermal field (or other type of field) can be measured with a suitable sensor. The measurements and simulation may be generated based on a different version of the article. For example, a different additively manufactured version, perhaps with uniform honeycomb or some other infill structure. Or, from a version of the article manufactured by a different non-additive manufacturing method. As yet another alternative, the field data may be user specified and not based on simulated or actual field data. It should also be understood that the field data may not include intensity values for the entire area of the field corresponding to the article. For example, the field data might include some minimum and/or maximum values corresponding to locations on the part with other intensity values being interpolated. The field data may represent a physical field that the resultant additively manufactured part is expected to be subject to, such as internal stress under certain expected loading conditions, certain thermals under expected temperature exposure levels, or essentially any other field the part is expected to experience. The field data may or may not be available at the layer level of the article. In instances where the field data is available by layer, the layer field data can be utilized. However, in instances where layer field data is not available, surface field data may be applied to each layer. Such data may be applied as is, assuming substantially similar field experience for each layer, or an interpolation method may be utilized based on surface values and relative position of the subject layer.

Figure 9B:
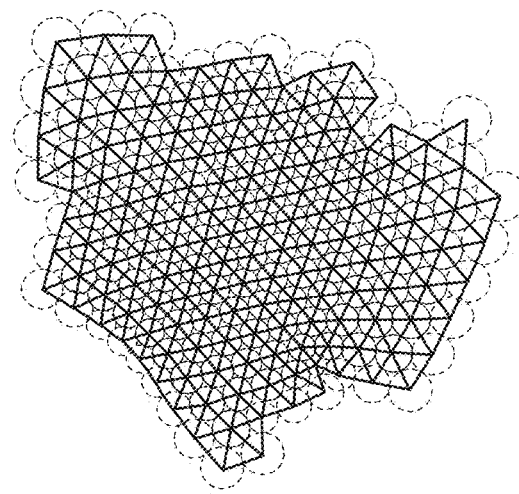
Figure 9C:
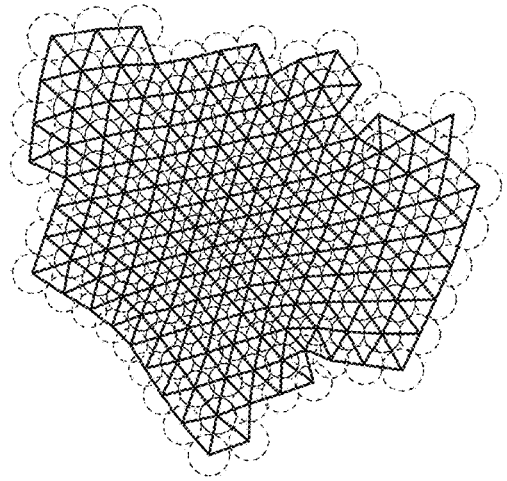
Figure 9D:
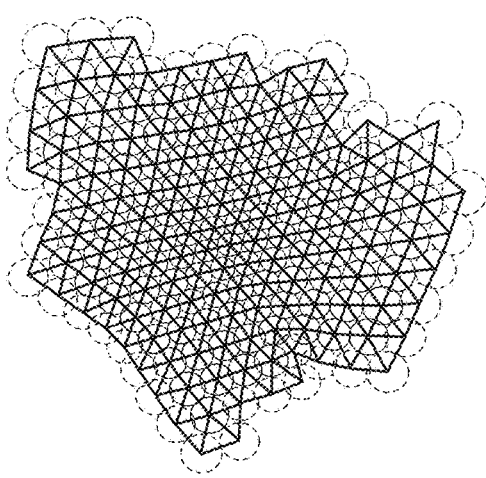

Referring back to the specific field-smoothed embodiments depicted in FIGS. 9B-D. Both embodiments start from the same initial state (i.e., complex K) as shown in FIG. 7. An example of the first embodiment with a minimum circle radius of 8 and maximum circle radius of 60 is illustrated in FIG. 9B. FIG. 9C illustrates an example of the second embodiment with a minimum circle radius of 10, maximum circle radius of 50, and user parameter $\in=0.75$. FIG. 9D illustrates another version of the second embodiment, this one with a minimum radius of 10, maximum radius of 50, and user parameter of $\in=0.95$. The units for the circle radii can be any suitable unit depending on the application and scale of the desired infill structure. For example, the units may refer to centimeters, millimeters, or another measurement unit appropriate for the application and scale of the article being fabricated.

Figure 10A:
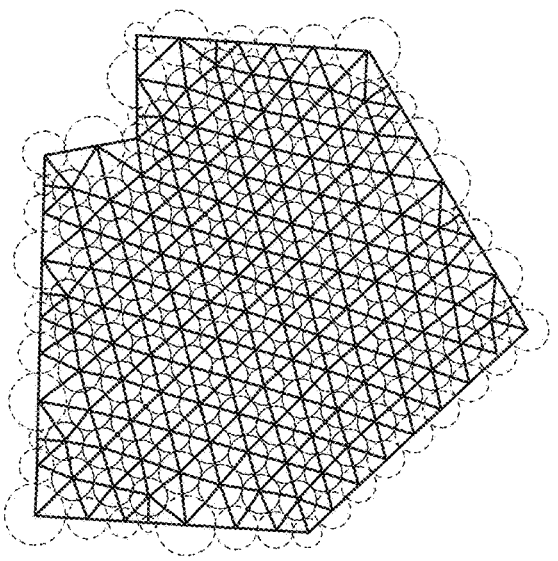
FIGS. 10A-C show an example of incorporating both the stress field and the polygon boundary condition constraints for several field-based smoothing embodiments.
Figure 10B:
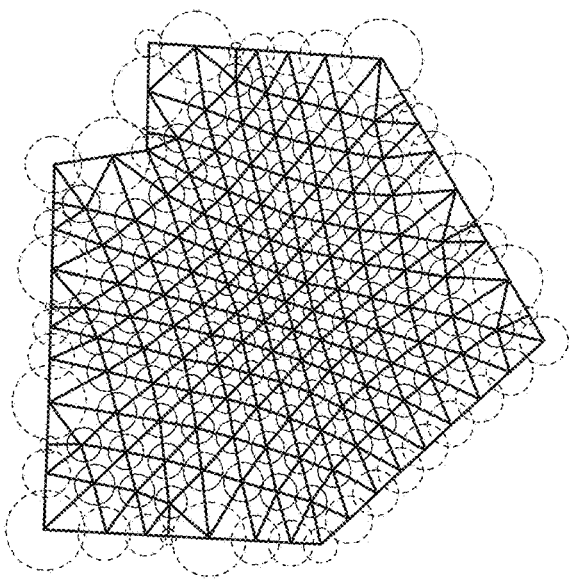
Figure 10C:
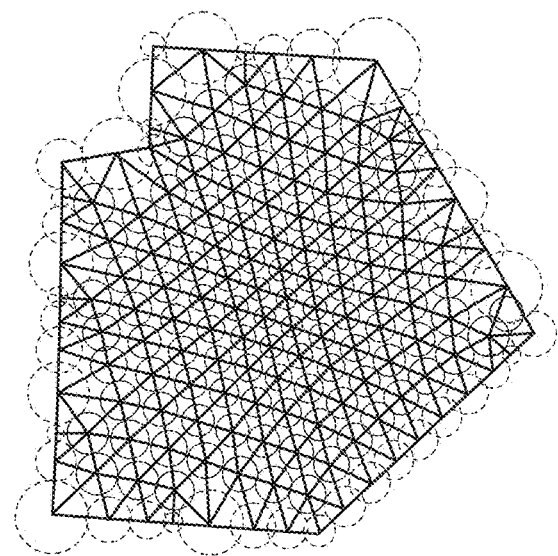

FIGS. 10A-C show examples of incorporating both the stress field and the polygon boundary condition constraints for both embodiments discussed above. Specifically, the FIG. 10A illustrates a grid generated by the first embodiment with a desired minimum radius of 8 and maximum radius of 60. In this case, the underlying stress field contributes almost no change from the unstressed case of FIG. 7. FIG. 10B illustrates another version of the first embodiment but with the minimum radius set to −50. This exaggeration allows the system to better incorporate the stress field. FIG. 10C illustrates an exemplary complex with minimum radius 10, maximum radius 50 and $\in=0.95$. This achieves a qualitatively similar effect as the FIG. 10B complex, but without the using a negative radius input as an exaggeration.

Infill Lattice Generation Topology

Two graphs $G_1$ and $G_2$ are isomorphic if there is a bijection $f:V(G_1) \rightarrow V(G_2)$ mapping the vertex set of $G_1$ to the vertex set of $G_2$ such that uv is an edge of $G_1$ if and only if $f(u)f(v)$ is an edge of $G_2$. Colloquially, two graphs are isomorphic if they are re-labelings or re-drawings of each other. The isomorphism class of a graph G is the set of all graphs that are isomorphic to G.

With respect to tailored sectioning and field-based smoothing, they can generate graphs whose dual graphs are isomorphic to a subgraph of the honeycomb (hexagonal) lattice. For example, FIG. 11 illustrates an un-deformed graph, Graph A, that can be deformed utilizing one of the embodiments of the present disclosure into a deformed graph, Graph B, illustrated in FIG. 12. The dual graphs, DualGraph A and DualGraph B, of Graphs A and B are shown in FIGS. 11-12. DualGraph A is isomorphic to DualGraph B and likewise, DualGraph B is isomorphic to DualGraph A. It is worth noting that Graph A is not isomorphic to DualGraph A or DualGraph B.

One difference between tailored sectioning and field-based smoothing is that field-based smoothing allows for more precise control of the isomorphism class of the graph that is generated. The field-based smoothing maintains the same isomorphism class for the underlying graph throughout the process (meaning that no vertices, edges, or faces in the graph are added or removed). This means that if the dual graph of the initial grid is hexagonal and isomorphic to a subgraph of the hexagon lattice, then the dual graph of the final grid will also be hexagonal and isomorphic to a sub-graph of the hexagonal lattice.

Small-Scale Additive Manufacturing Example

The systems and method for lattice generation can be applied to generate an infill structure for a 3D printed article, such as an airplane wing. FIGS. 4A-C illustrate three exemplary wings that can be manufactured in accordance with embodiments of the present disclosure.

Field Data

The field data can be representative of essentially any physical characteristic of the part being additively manufactured. Internal stress field and thermal fields are two practical applications, but essentially any field that varies over the extent of the part can have practical application in connection with the embodiments of the present disclosure. In many practical applications, field data will include values representative of physical characteristics, such as thermal or stress characteristics. The field data can be obtained from essentially anywhere. For example, field data can be communicated over a network from a database or server having a repository of such data, determined experimentally by use of sensors on a prototype, duplicate, or other physical representation of the target part, or via simulation based on characteristics of the target part.

In one embodiment, a static loading or other type of simulation can be performed, e.g., via finite element analysis (FEA). Such a simulation can be performed with commercial FEA software, such as Abaqus 2018 or other FEA software. Although such a simulation can produce a stress field that can be utilized in connection with the embodiment of the present disclosure, it should be understood that the lattice generation systems and method of the present disclosure can accept a field from any type of loading case or a combination of multiple loading cases, provided that the output of the simulation is presented in a two-dimensional field.

Infill Lattice Generation

Embodiments of tailored sectioning and field-based smoothing methodologies can be adapted for use in additive manufacturing slicer software to generate an infill lattice structure for a part to be additively manufactured. For example, referring to FIG. 2A, a non-uniform honeycomb infill structure with two distinct size hexagon patterns can be generated with slicer software incorporating an embodiment of the tailored sectioning. Referring to FIG. 2B, an exemplary non-uniform honeycomb infill structure with gradually graded hexagons can be generated with an embodiment of the field-based smoothing. As another example, referring to FIG. 4C, a non-uniform honeycomb infill can be generated based on a combination of embodiments of tailored sectioning and field-based smoothing methodologies. The average hexagon size was calibrated so that the infill of each wing has an equal weight of about 74 g.

The infill structures of FIGS. 4A-C can be manufactured in a small-scale 3D printer, such as a Stratasys Fortus 400MC, with ABS plastic filament. Stiffness of infill lattice structures generated with the systems and methods of the present disclosure can be evaluated with static load testing. Generally, load weight and deflection show a linear relationship. Field-based smoothing tailored sectioning methodologies generally produce infill lattices that deflect less relative to uniform infill lattice structure counterparts for the same load, with infill lattices generated by a combination of tailored sectioning and field-based smoothing deflecting even less.

Through calibration of the parameters in both methods (Smoothing and Sectioning), the disparity of the pattern size can be increased in order to improve stiffness. Field-based smoothing may be better for certain applications and tailored sectioning may be better for certain applications. Field-based smoothing generates a lattice structure with gradually changing unit size, and the disparity of the unit size can be changed via calibration and parameter selection (i.e., difference between small hexagon and large hexagon). Tailored sectioning can generate an infill lattice structure with an abrupt change in the unit size, which can be desirable in some applications. However, it is also possible with tailored sectioning to partition an area into multiple sections and assign slightly larger or smaller unit circle sizes from one section to the next section, which can provide a non-uniform honeycomb lattice with more visually gradual changes, and provide a great degree of control.

Large-Scale Additive Manufacturing Example

Embodiments of the present disclosure can also be utilized in large-scale additive manufacturing. The geometry and the dimensions of an exemplary flat wing for large-scale additive manufacturing printing are shown FIG. 13A. A finite element analysis (FEA) can be performed on the flat wing design, with suitable boundary conditions applied to the flat wing. Further constraints can be applied, such as pressure constraints and elastic material properties. A von Mises stress field, or other type of stress field, can be obtained from the FEA simulation as shown in FIG. 17B.

Figure 14:
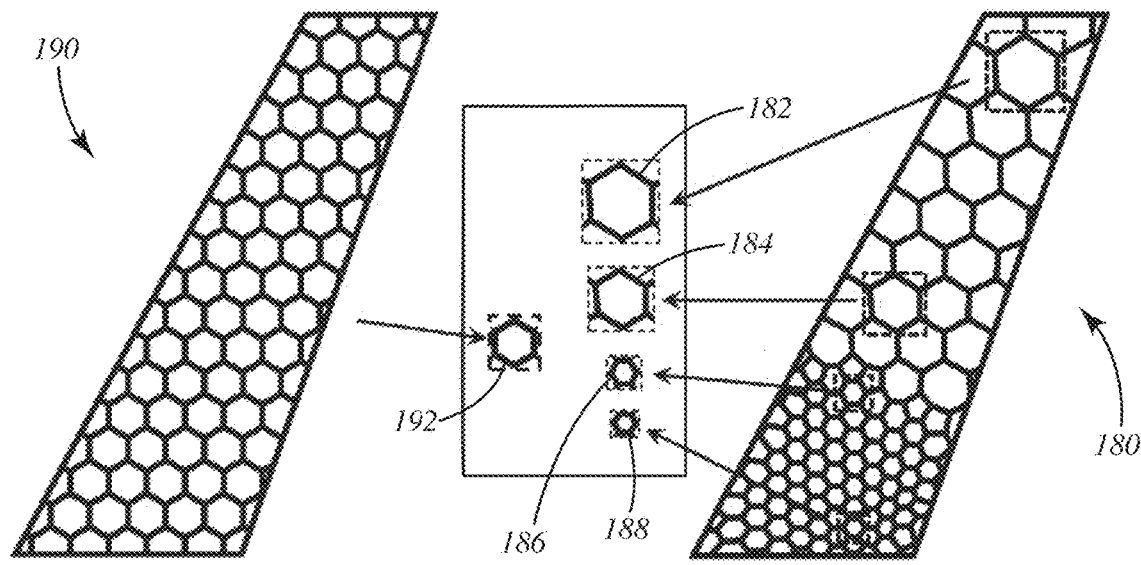
FIG. 14 illustrates contrasting sizes between hexagon cells of a uniform lattice fabricated and hexagon cells of a non-uniform lattice fabricated in accordance with an embodiment of the present disclosure.

By way of example, a uniform lattice structure in the domain of the wing can be generated as shown in FIG. 14. An optimized lattice structure 180 can be generated with both the tailored sectioning method and the field-based smoothing method. The width of the lattice ribs in this case is set to about 0.26 inches (~6.6 mm), which is two-bead widths of the extruded material from the nozzle diameter of 0.1 inch without a tamper. The boundary line of the wing can be added to the lattice structure to close the incomplete polygons at the boundary. The width of the boundary line can be set to the same width of the lattice ribs (6.66 mm) or a different value. The addition of the boundary line can be done using computer-aided design (CAD) software. The size of the unit cell (in this case, the hexagon cell) of the uniform lattice was calibrated such that the total weight of the uniform lattice wing matches the total weight of the optimized lattice wing. In the generated optimized lattice, the hexagon unit size decreases as the location moves down from the tip of the wing to the root of the wing. The gradual decrease in the cell size from hexagon cell 182 to hexagon cell 184 and from hexagon cell 186 to hexagon cell 188 results from application of the field-based smoothing method. The abrupt change in the cell size from hexagon cell 184 to hexagon cell 186 results from application of the tailored sectioning method. FIG. 14 shows an exemplary comparison of the cell sizes between the uniform lattice 190 and optimized lattice 180, specifically one exemplary lattice cell 192 of the uniform lattice 190 is depicted next to several exemplary lattice cells 182, 184, 186, 188 of the tailor sectioned and field smoothed lattice 180. In this exemplary embodiment, it is worth noting that the two lattices 180, 190 have about the same weight (1.1 kg), and the hexagon size of the uniform lattice (71.5 mm) is in between the size of hexagon cell 184 (89.3 mm) and the size of hexagon cell 186 (42.4 mm) in the optimized lattice as shown in FIG. 14.

Put simply, FIG. 14 illustrates a wing design with a uniform lattice and a wing with an optimized lattice fabricated in accordance with the tailored sectioning and field-based smoothing embodiments of the present disclosure. FIG. 14 also shows a comparison of the hexagon size from the uniform lattice and the optimized lattice. In this case, the article material is acrylonitrile butadiene styrene (ABS) reinforced with 20% wt. carbon fiber, though essentially any other suitable material could be used for the fabrication. A nozzle diameter of 0.1 inch (2.54 mm) and layer height of 0.05 inch (1.27 mm) was used in this embodiment, though different values could be used within the scope of embodiments of the present disclosure. The print includes ten layers, though other prints in accordance with the disclosure may include additional or fewer layers.

Additive Manufacturing System Example

Figure 15:
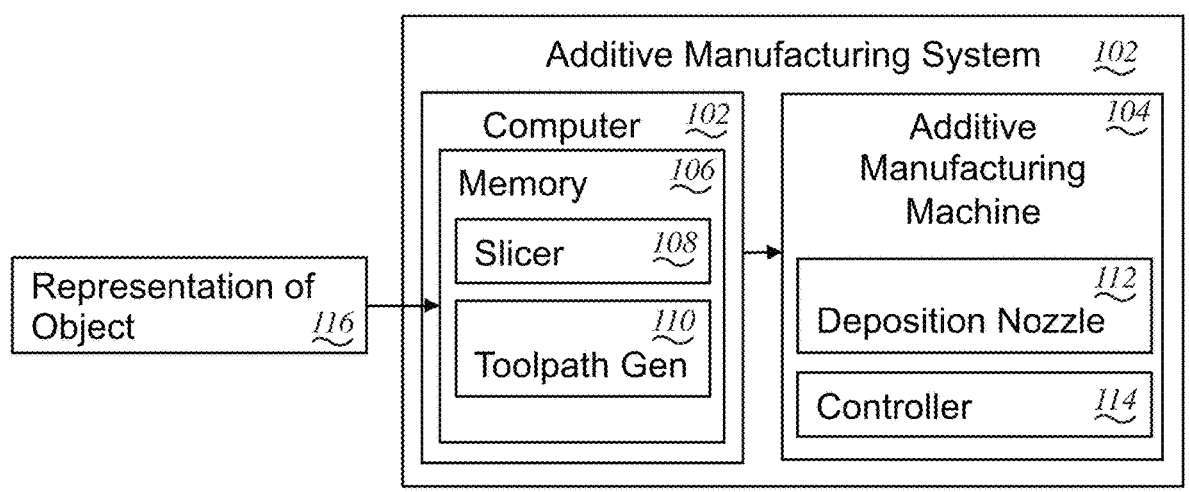
FIG. 15 illustrates a representative block diagram of one embodiment of an additive manufacturing system for use in connection with aspects and embodiments of the present disclosure.

Embodiments of the present disclosure can be utilized in connection with an additive manufacturing system. One exemplary additive manufacturing system 100 in accordance with one embodiment of the present disclosure is illustrated in FIG. 15. The additive manufacturing system 100 generally includes a computer 102 and an additive manufacturing machine 104. Computers and additive manufacturing machines are generally well known and therefore will not be described in detail. Suffice it to say, a computer or processor 102 can essentially be any hardware or combination of hardware, local, remote, or distributed, capable of receiving a representation of an object 116, executing a slicing algorithm 108 on the representation 116 in order to generate a toolpath 110 and additive manufacturing instructions. The algorithms can be stored in memory, individually or collectively, as instructions for execution by a computer processor. For example, the slicer and toolpath generation algorithms may be referred to collectively as a slicer software program that outputs (e.g., stored in memory or communicates to another module or apparatus) additive manufacturing instructions.

Further, the system can include an additive manufacturing machine 104 that can be essentially any suitable additive manufacturing equipment that can generate an additive structure according to additive manufacturing instructions generated by the slicer software program. For example, for deposition based additive manufacturing systems, in operation, the computer 102 receives a representation of an object 116 and a slicer 108 slices the model 116 and generates a toolpath 110 for successively additively manufacturing each layer (e.g., by deposition of material from a nozzle that moves about a print area according to the instructions). The output of the programs can ultimately be provided in the form of additive manufacturing instructions to the additive manufacturing machine 104. The slicer 108 and toolpath generator 110 can be separate parts of one software program or can be stand-alone software programs that execute on the computer and can communicate directly with each other or indirectly, for example via files stored in memory on the computer. The controller 114 of the additive manufacturing machine 104 controls the deposition nozzle 112 according to the instructions to additively manufacture the object layer by layer. Although the additive manufacturing system 100 described herein is a deposition based system with a deposition nozzle, other types of additive manufacturing machines can be utilized in connection with embodiments of the present disclosure. The particular methodology for additively manufacturing infill structures generated in accordance with embodiments of the present disclosure can vary from application to application. U.S. patent application Ser. No. 16/750,631, filed on Jan. 23, 2020 to Seokpum, and hereby incorporated by reference in its entirety, describes various systems and methods for additive manufacturing with toolpath bridges that can be utilized in connection with the embodiments of the present disclosure.

Forming an additive structure, such as a lattice infill structure, includes any process in which a three-dimensional build, part, object, or additive structure is formed in successive layers according to one or more additive manufacturing techniques. The systems and methods discussed herein are suitable for both small and large scale additive manufacturing. The embodiments are applicable for essentially any additive manufacturing systems involving generation of a non-uniform infill. For example, suitable additive manufacturing techniques for use in conjunction with embodiments of the present disclosure include, by non-limiting example, direct energy deposition (DED), material extrusion (e.g., fused deposition modeling (FDM)), welding-based systems, material jetting, binder jetting, powder bed fusion, and essentially any other additive manufacturing process.

The additive structure can be formed with essentially any material or combination of materials used in additive manufacturing. This can include additive manufacturing materials now known or hereinafter developed. Suitable materials can include plastics, fiber composites, ceramics, metals, and other materials. For example, thermoplastics, thermosets, rubber, silicone, carbon fiber, and glass fiber, glass fiber-filled ABS, carbon fiber-filled ABS, to name a few different materials suitable for use with the embodiments of the present disclosure.

Molecular Dynamics Infill Lattice Generation

Another aspect of the present disclosure is generally directed to systems and methods for molecular dynamics based infill lattice generation. In particular, a force balance equation can be used as the foundation for a system and method for generating non-uniform infill lattice structure based on field data.

The molecular dynamics infill lattice generation of the present disclosure is inspired by the Lennard-Jones potential equation $$V = 4e\left[\left(\frac{\sigma}{r}\right)^{12} - \left(\frac{\sigma}{r}\right)^{6}\right].$$

The equation and graph illustrate an intermolecular pair potential, sometimes referred to as the 12-6 potential. It provides an archetype model for realistic intermolecular interactions.

A force balance equation generally has two terms: pushing force (i.e., repulsive force) and pulling force (i.e., attraction force). A force balance equation essentially involves locating nodes (e.g., two nodes a distance r apart) such that the pushing and pulling forces are balanced to meet a particular equilibrium. If nodes are positioned too close, the pushing force become dominant, and the nodes push each other away. However, if the two nodes are positioned too far apart, the pulling force becomes dominant over the pushing force, and the nodes are pulled toward each other, or if the nodes are even farther apart, then the overall force may become very weak and the nodes do not exert any appreciable force on one another, pushing force or pulling force. These three states are illustrated in the FIG. 16 graph. The vertical line 302 illustrates the distance apart the two nodes end up staying. If they are too close (i.e., to the left of line 302), the nodes push each other. If they are far apart, they pull each other (i.e., to the right of line 302). And, if they are too far apart, the pulling is weak (i.e., on the far right side of the graph).

With this backdrop, an embodiment of the molecular dynamics based infill lattice generation method will now be described.

Figure 17:
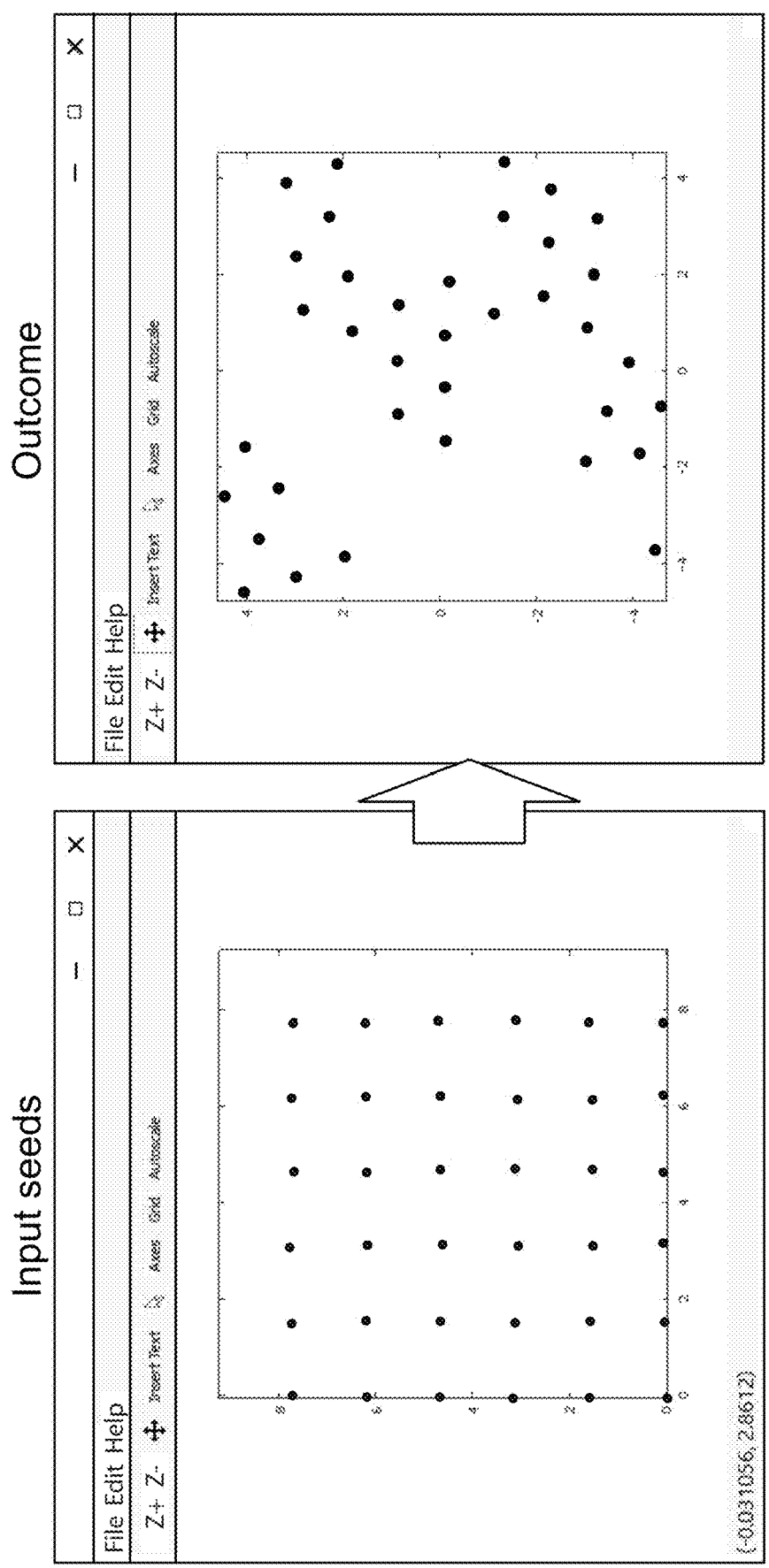
FIG. 17 illustrates screenshots of representative visualizations of an initial node distribution and an output node distribution after force balancing is applied to the initial node distribution.
Figure 18:
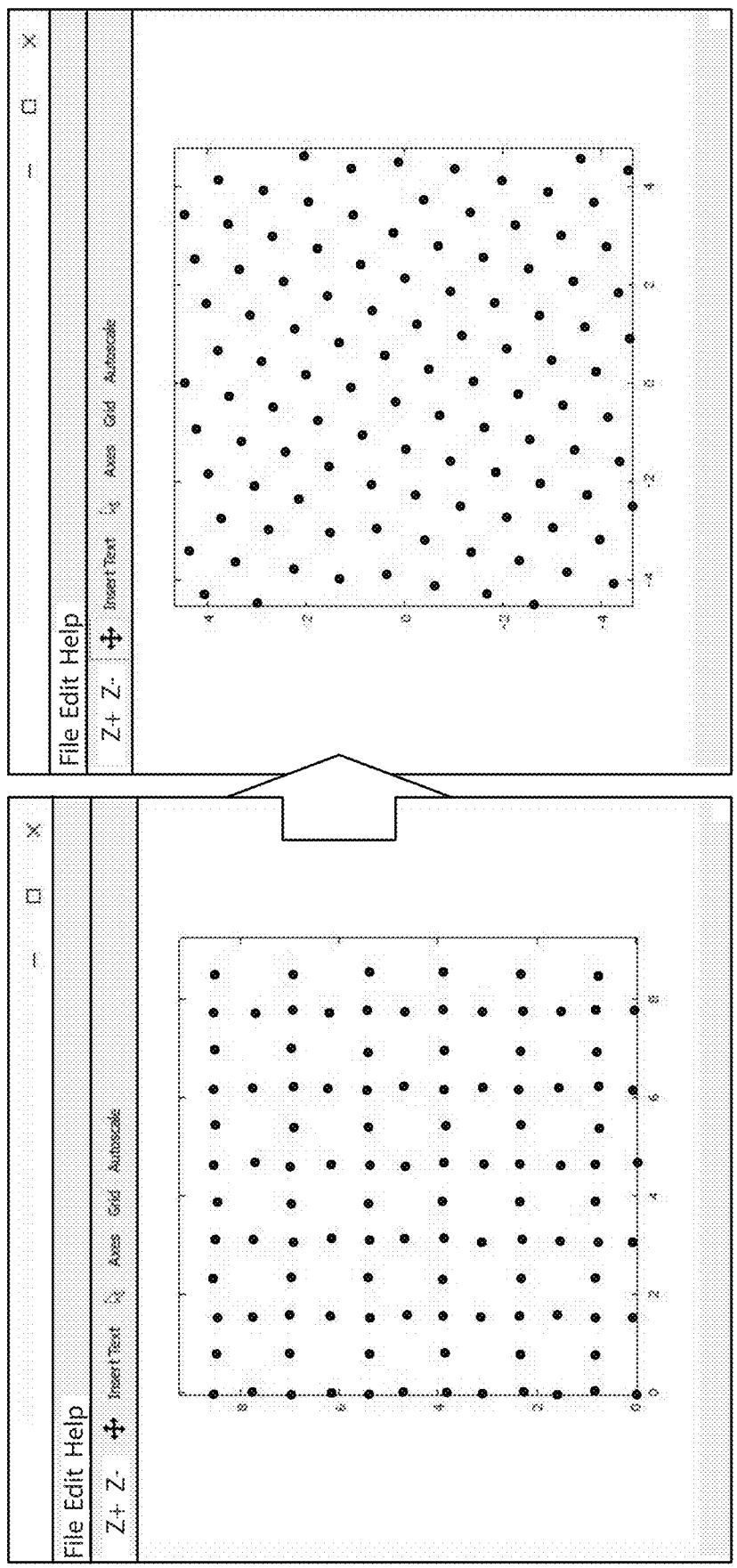
FIG. 18 illustrates screenshots of representative visualizations of an initial node distribution with a larger number of nodes than FIG. 17 and an output node distribution after force balancing is applied to the initial node distribution.

The method can begin with a number of nodes being obtained, generated, or defined over a surface representing the infill layer to be generated, e.g., either randomly distributed or regularly distributed. These nodes form a two-dimensional set of input seeds. FIGS. 17-19 illustrate different numbers of input seeds (i.e., nodes) that represent a two-dimensional area of atoms and their output configuration after the molecular dynamics infill generation methodology is applied and the positions of the nodes are adjusted.

FIG. 17 shows an example of a relatively low number of input seeds for a given two dimensional area and the resulting positions of the nodes after the method adjusts the locations of the nodes. That is, after the method is applied, the output shows the nodes in positions where the forces are balanced. If the nodes are too far apart, they lose the interaction force. The amount of nodes can vary by application—if too few nodes are generated as the input seeds, then the nodes tend to cluster in the output, as shown in FIG. 17.

FIG. 18 shows a larger number of nodes that are representative of atoms. Again, the nodes are randomly or regularly distributed across a two-dimensional area. When the molecular dynamics based infill lattice generation method is applied with a sufficient number of nodes, such as the case with FIG. 18, the nodes evenly space out from each other in the output, as shown.

If the number of nodes representing atoms is allowed to fill the entire domain as shown in FIG. 19, then the nodes evenly space out with a shorter distance from each other in the output. Because there are a large number of nodes, when a stress field is imposed, the effect of the input stress will be less significant.

A modified version of the force balance equation can be utilized that integrates field data into the force balancing. For example, an input stress factor α can control the distance between nodes at a certain area. This can be accomplished with the following modified Lennard Jones Potential, with alpha representing an input stress factor:

$$V = 4e\left[\left(\frac{\sigma}{r}\right)^p - \alpha\left(\frac{\sigma}{r}\right)^q\right]$$

Figure 16:
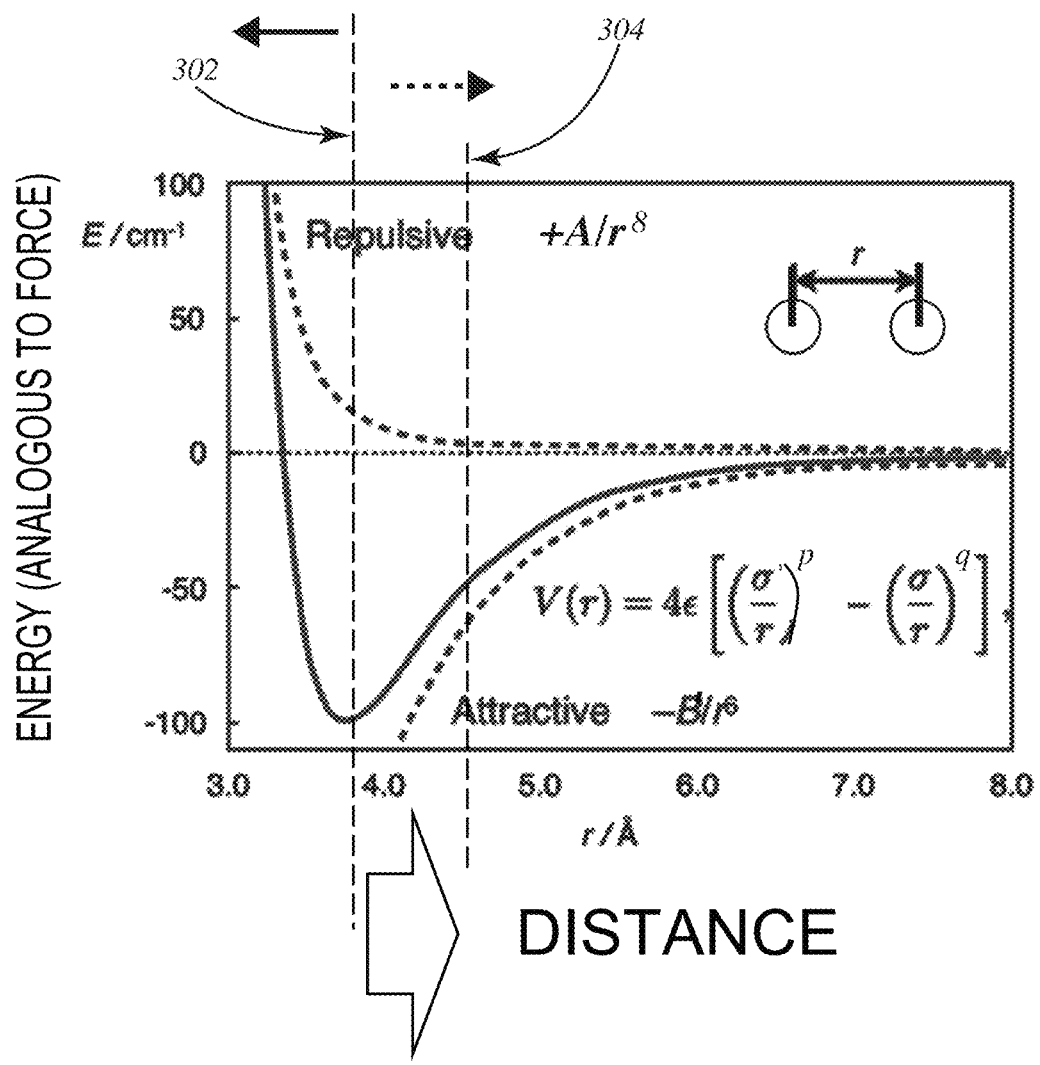
FIG. 16 illustrates an exemplary force balance graph.

Inclusion of the input stress factor effectively shifts the equilibrium distance. For example, as shown in FIG. 16, the equilibrium distance line 302 shifts to line 304.

The p and q values can be varied depending on the application. In some applications, the p and q values are set to 8 and 6, respectively. However, in alternative embodiments, the p and q values can be set to other suitable values such as 4 and 2. In general, with lower values, the effect of alpha (input stress factor) becomes more pronounced in the node distribution, and with higher values, vice versa.

Figure 20A:
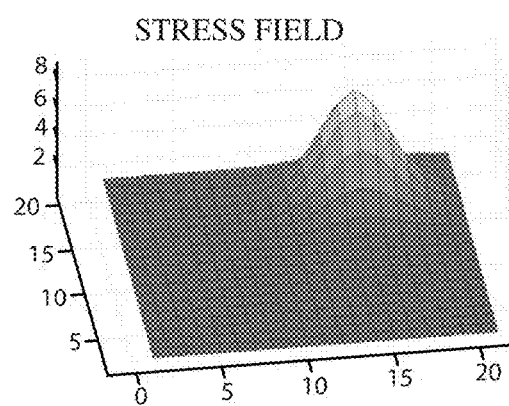
FIGS. 20A-D illustrate integration of a stress field into a node distribution force balancing to generate an output node distribution, triangulation of that node distribution, and dual graphing of the triangular graph to generate a generally hexagonal lattice according to an embodiment molecular dynamics based infill generation.
Figure 20B:
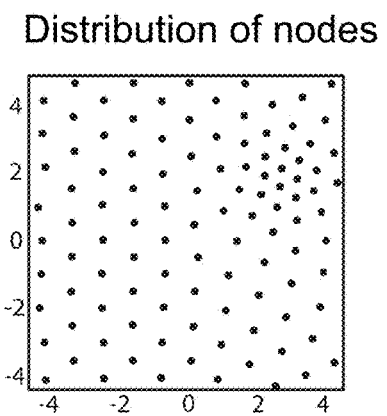
Figure 20C:
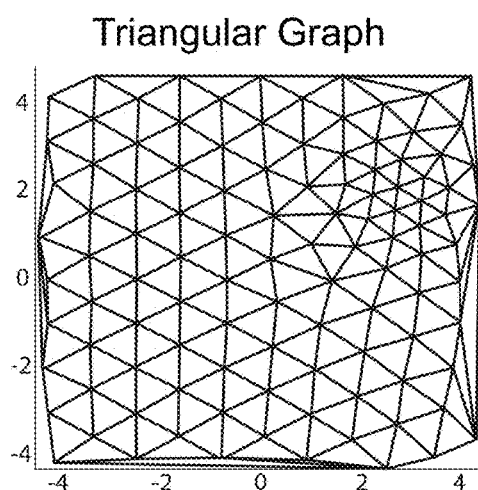
Figure 20D:
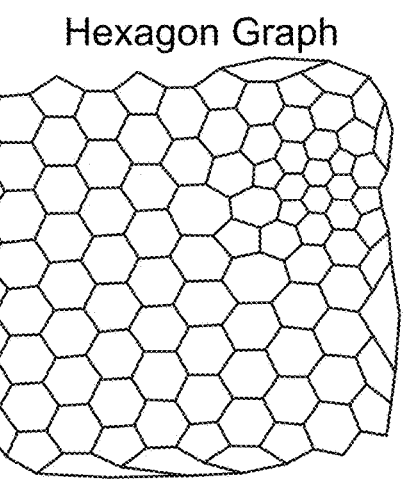

FIGS. 20A-D illustrates an exemplary embodiment of the molecular dynamics infill lattice generation process. The process begins with a representation of a stress field, e.g., as shown in FIG. 20A. FIG. 20A illustrates a stress field with a distribution of intensity field values that represent a high stress near the upper right corner. The stress field is converted to a two-dimensional node distribution, such as depicted in FIG. 20B. The node distribution represents the same stress field by virtual of node density representing higher intensity values of the stress field. Triangulation is then applied to the node distribution to generate a triangular graph over the same two-dimensional area, such as shown in FIG. 20C. The triangle density represents higher stress values in a similar fashion as the node density. From there, the dual graph can be obtained of the triangular graph, which generates a generally hexagonal graph (with a few other types of polygons with fewer or additional numbers of sides. If applied over a surface of an article layer for additive manufacture, the hexagonal graph provides a molecular dynamics infill lattice.

FIG. 21A-C provides another example of a hexagonal graph derived from a different stress field (not shown). In this embodiment, the stress field has a high intensity stress values at the center of the graph, but has otherwise normal stress values. The resultant node distribution from converting such a stress field is illustrated in FIG. 21A. The triangulation of that node distribution is shown in FIG. 21B. And, the dual graph of that triangular graph is shown in FIG. 21C, which results in a non-uniform, continuous, and generally hexagonal graph, with some transition polygons with different number of shapes towards the edges or other regions where the triangle size changes.

Figures 22A, 22B:
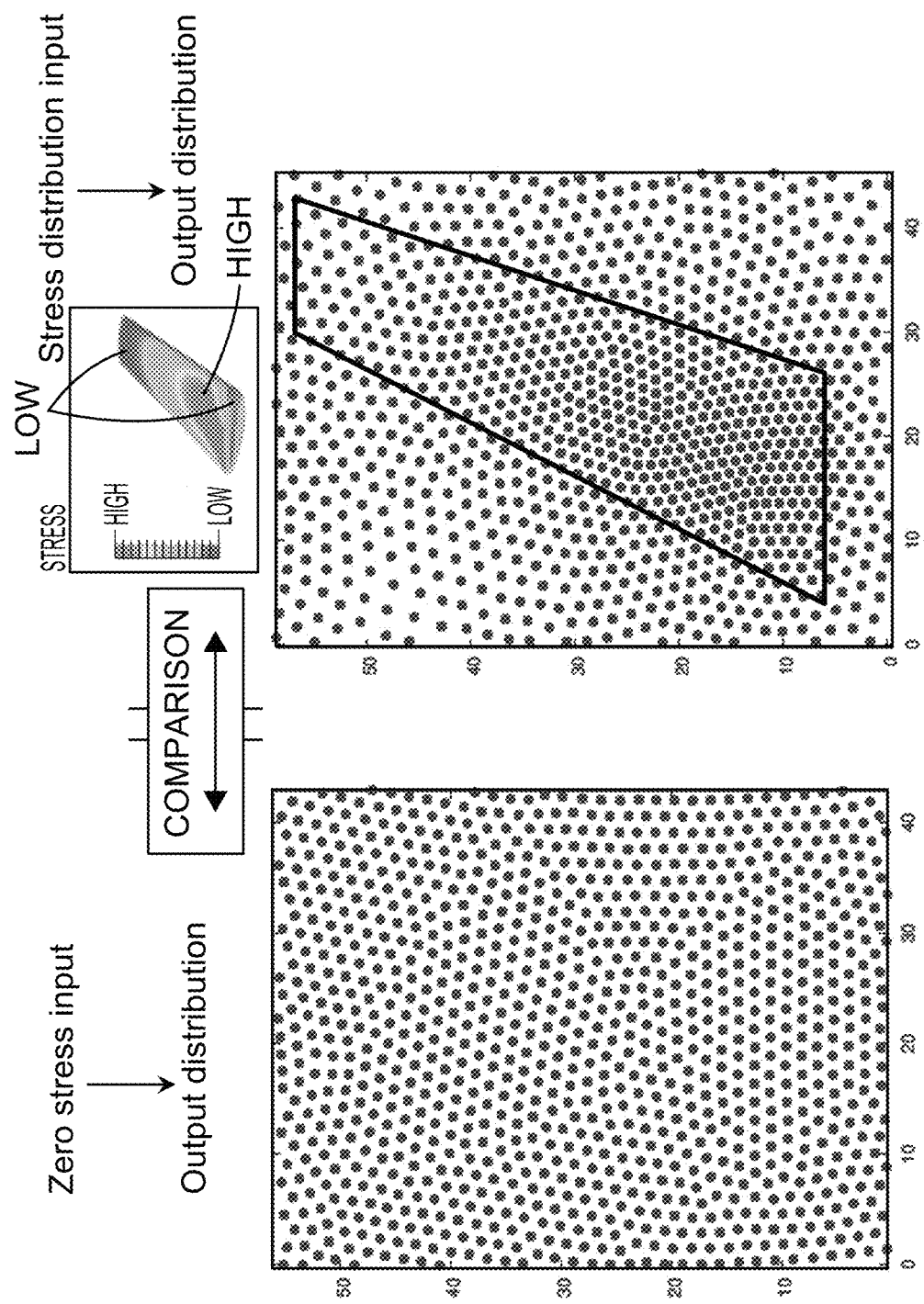
FIGS. 22A-B illustrate a comparison between a force balanced node distribution without a stress field input against a force balanced node distribution with an exemplary stress field, with an overlay representative of the infill perimeter boundary of the article to be fabricated.

A comparison between a node distribution converted from a zero input stress field and a node distribution converted from an exemplary stress distribution input for an exemplary wing structure under loading is shown in FIG. 22A-B. In this exemplary stress distribution input, the stress input values range from about 0 to about 6.4e+5 Mises (i.e., 640,000), with an average stress of about 75%. The comparison shows how, for zero stress input, the resultant node distribution is more or less uniform, but the node distribution that integrates the wing stress field has nodes densely clustered near the bottom of the wing, where the highest stress correlates, and has nodes sparsely clustered near the top of the wing, where the lowest stress correlates.

Figure 23A:
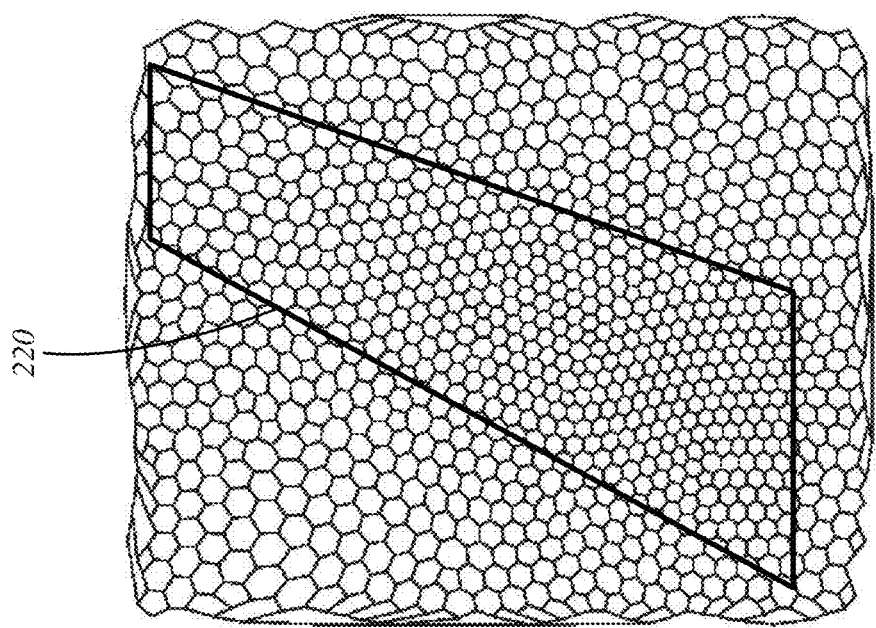
FIGS. 23A-B illustrate triangulation and dual graphing of the node distribution of FIG. 22B along with an overlay representative of the infill perimeter boundary of the article to be fabricated.
Figure 23B:
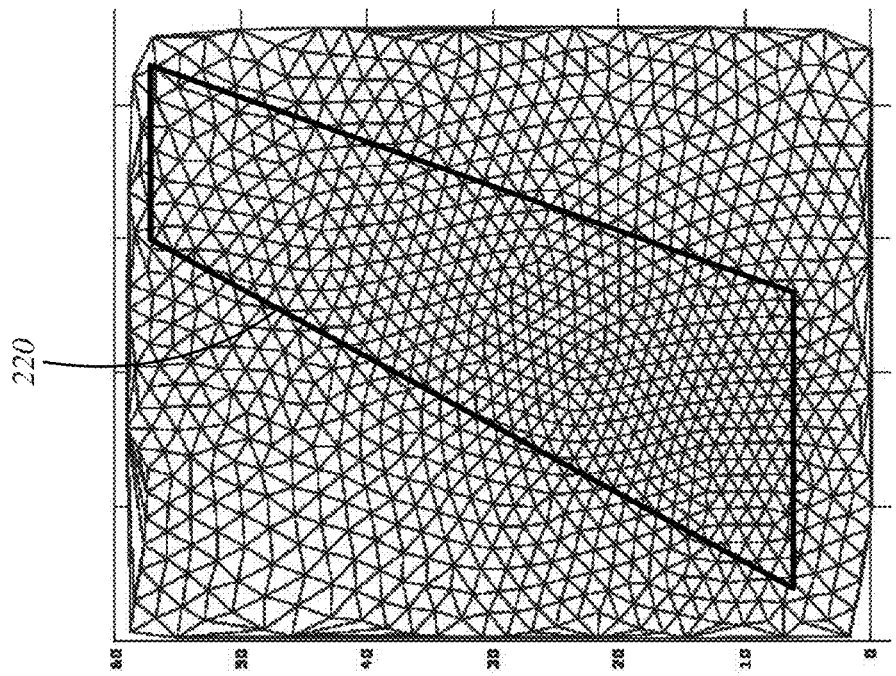

Continuing with the stress integrated node distribution from FIG. 22B, FIGS. 23A-B illustrate a triangulated graph obtained from the node distribution, as well as the dual (generally hexagon) graph obtained from the triangulation. The straight lines overlaid on the graphs of FIG. 22B and FIGS. 23A-B show the boundary of the wing 220.

Figure 24:
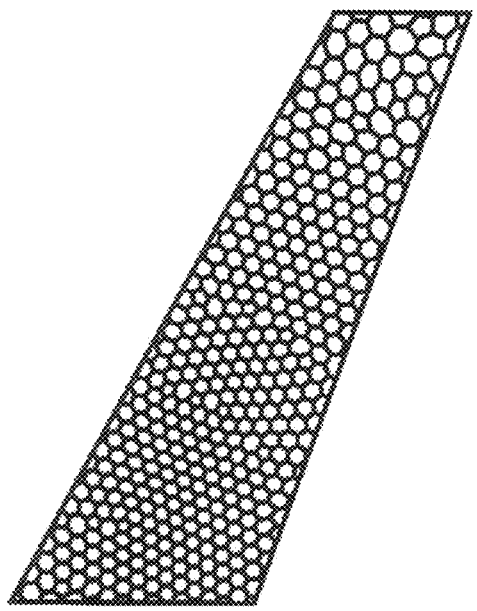
FIG. 24 illustrates a front representative view of an infill structure generated by force balancing a field influenced node distribution utilizing an embodiment of molecular dynamics based infill generation with a first number of nodes in the node distribution.
Figure 25A:
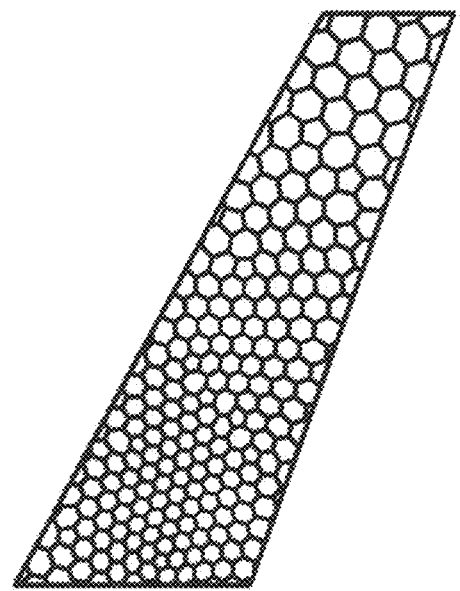
FIGS. 25A-B illustrates front and perspective representative views of an infill structure generated by force balancing a field influenced node distribution with fewer nodes than FIG. 24 utilizing an embodiment of molecular dynamics based infill generation.
Figure 25B:
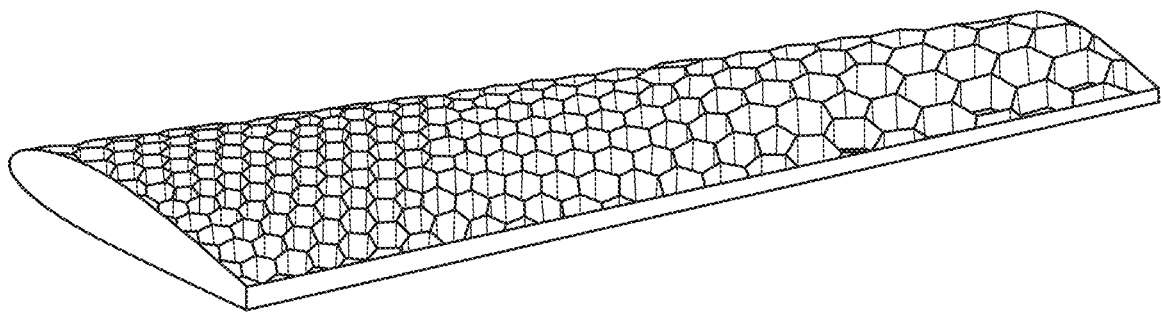

FIGS. 24 and 25A-B illustrate two exemplary lattice infill structures generated with the molecular dynamics infill generation system and method. By controlling the number of nodes in the starting node distribution, the relative size of the hexagon cells in the ultimate infill lattice that is generated can be controlled. In general, the larger the number of nodes in the starting node distribution, the smaller the size of the hexagons (and other polygons) in the lattice. FIG. 24 illustrates a representative front view of an exemplary infill structure for a wing generated with a molecular dynamics infill generation method using the same stress field of FIG. 22B. FIGS. 25A-B illustrates representative front and perspective views, respectively, of an infill structure for a wing generated with the molecular dynamics method using the same stress field, but with a larger number of initial nodes in the node distribution than the FIG. 24 node distribution.

Accordingly, the molecular dynamics infill generation method can generally be described by the following steps: defining an initial node distribution, adjusting the spacing between the nodes to reach, increase, or maximize a force balance equilibrium between the nodes, wherein the force balance equilibrium accounts for field intensity values of a field, such as a stress field, triangulating the adjusted node distribution to generate a triangular graph, and dual graphing the triangular graph to obtain a dual graph representative of an infill structure corresponding to the field data. The infill structure can be aligned to the boundary of the part being additively manufactured and converted to additive manufacturing instructions. Because of the molecular dynamics, node distribution, triangulation, and dual graph, the resultant lattice structure will be non-uniform, but generally hexagonal with transitions between different size hexagons having different numbers of sides. The infill structure will automatically provide a continuous lattice structure that can be constrained by the boundary of the part and provide vertices that match the part boundary.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method for fabricating an article, the article configured to experience, during operation of the article, a physical field having a non-uniform intensity over the extent of the article, the method comprising:
   generating, by a computer system, representations of layers of the article, each layer comprising an infill portion, wherein a representation of each layer's infill portion comprises a corresponding molecular dynamically generated lattice having cells, wherein generating the molecular dynamically generated lattice for a corresponding layer's infill portion comprises:
   (i) obtaining an initial node distribution over the extent of the infill portion of the layer,
   (ii) force balancing the spacing between the nodes in the initial node distribution toward a force balance equilibrium to generate a force balanced node distribution, wherein the force balance equilibrium is adjusted based on the physical field having the non-uniform intensity,
   (iii) computing an intermediate lattice having triangular cells, such that vertices of a triangular cell correspond to three adjacent nodes of the force balanced node distribution, and
   (iv) computing the molecular dynamically generated lattice having polygonal cells with 4 to 8 walls, such that sides of a polygonal cell correspond to segments between centers of adjacent triangles of the intermediate lattice: and
   for each layer of the article, printing, by an additive manufacturing printer in communication with the computer system, a respective structure embodying the corresponding molecular dynamically generated lattice in the layer's infill portion.

2. The method for fabricating an article of claim 1, wherein the molecular dynamically generated lattice is a graded honeycomb lattice having hexagonal cells of different side lengths, such that smaller side lengths correspond to high values of the physical field and larger side lengths correspond to low values of the physical field.

3. The method for fabricating an article of claim 1, wherein obtaining the initial node distribution over the extent of the infill portion of the layer includes selecting the number of nodes and generating an initial node distribution based on the selected number of nodes.

4. The method for fabricating an article of claim 1, wherein generating the initial node distribution based on the selected number of nodes includes spreading the nodes over the extent of the infill portion of the layer such that spacing between nodes is one of at least random and regular.

5. The method for fabricating an article of claim 1, wherein obtaining the initial node distribution over the extent of the infill portion of the layer includes distributing at least a portion of nodes onto a boundary of the infill portion of the layer.

6. The method for fabricating an article of claim 5, including pinning at least a portion of nodes onto the boundary of the infill portion of the layer such that force balancing spacing includes changing spacing between nodes by adjusting unpinned node positions without adjusting pinned node positions.

7. The method for fabricating an article of claim 1, wherein the additive manufacturing printer in communication with the computer system is at least one of a big area additive manufacturing (BAAM) printer and a small-scale additive manufacturing printer.

8. The method of claim 1, wherein the physical field is at least one of a stress field and a temperature field.

9. The method of claim 1, wherein printing the structure embodying the molecular dynamically generated lattice includes extruding material including at least one of a plastic, a fiber composite, a ceramic, and a metal.

10. A method for fabricating an article, the article configured to experience, during operation of the article, a physical field having a non-uniform intensity distribution over the extent of the article, the method comprising:
   generating, by a computer system, representations of layers of the article, each layer comprising an infill portion, wherein a representation of each layer's infill portion comprises a corresponding molecular dynamically generated and force-balanced lattice having cells, wherein generating the force-balanced lattice for a corresponding layer's infill portion comprises:
   (i) node-packing the infill portion of the layer to generate a force-balanced spacing node distribution of a plurality of nodes, wherein the node-packing includes:
      1) obtaining an initial node distribution over the extent of the infill portion of the layer; and
      2) force balancing the spacing between the nodes in the initial node distribution toward a force balance equilibrium to generate a force balanced node distribution, wherein the force balance equilibrium is adjusted based on the physical field having the non-uniform intensity,
   (ii) computing an intermediate lattice having triangular cells, such that vertices of a triangular cell correspond to three adjacent nodes of the force-balanced node spacing node distribution of the plurality of nodes, and
   (iii) computing the force-balanced lattice having polygonal cells with 4 to 8 sides, such that sides of a polygonal cell correspond to segments between centers of adjacent triangles of the intermediate lattice; and
   for each layer of the article, printing in communication with the computer system, a respective structure embodying the corresponding force-balanced lattice in the infill portion of the layer.

11. The method of claim 10, wherein the force-balanced spacing node distribution corresponds to a Lennard Jones potential modified by a stress factor of the physical field.

12. The method of claim 11, wherein the modified Lennard Jones potential satisfies the following equation, $$V = 4e\left[\left(\frac{\sigma}{r}\right)^p - \alpha\left(\frac{\sigma}{r}\right)^q\right]$$

wherein r is the distance between adjacent nodes, and $\alpha$ is a stress factor corresponding to the non-uniform intensity distribution over the extent of the article of the physical field.

13. The method of claim 12, wherein p=8 and q=6.

* * * * *